United States Patent
Takase et al.

(10) Patent No.: US 7,310,525 B2
(45) Date of Patent: Dec. 18, 2007

(54) NETWORK SERVICE SYSTEM USING TEMPORARY USER IDENTIFIER

(75) Inventors: Masaaki Takase, Kawasaki (JP); Yoichiro Igarashi, Kawasaki (JP); Haruyuki Takeyoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/097,635

(22) Filed: Apr. 1, 2005

(65) Prior Publication Data
US 2006/0116117 A1    Jun. 1, 2006

(30) Foreign Application Priority Data
Nov. 26, 2004   (JP)   ............... 2004-343147

(51) Int. Cl.
G06F 15/16   (2006.01)
H04M 3/00   (2006.01)
H04Q 7/20   (2006.01)

(52) U.S. Cl. .................. 455/435.2; 709/219; 455/420

(58) Field of Classification Search ............ 455/435.2, 455/432.1, 53.1, 404, 54.1–54.2, 420; 709/219, 709/225, 229, 203
See application file for complete search history.

(56) References Cited

U.S. PATENT DOCUMENTS 5,790,667 A   8/1998 Omori et al.
6,058,311 A * 5/2000 Tsukagoshi ............... 455/435.1
6,308,267 B1 * 10/2001 Gremmelmaier ............ 713/168
2003/0208562 A1 * 11/2003 Hauck et al. ............... 709/219
2005/0015491 A1 * 1/2005 Koeppel ..................... 709/226
2005/0208940 A1 * 9/2005 Takase et al. ............. 455/435.1

FOREIGN PATENT DOCUMENTS

| JP | 6-85811 | 3/1994 |
| JP | 7-170256 | 7/1995 |
| JP | 2002-268950 | 9/2002 |
| JP | 2003-178022 | 6/2003 |
| JP | 2003-345724 | 12/2003 |

* cited by examiner

*Primary Examiner*—Naghmeh Mehrpour
(74) *Attorney, Agent, or Firm*—Katten Muchin Rosenman LLP

(57) ABSTRACT

A network service system of the present invention comprises a temporary user identifier update request transmitting side device which provides a first service to a user and can transmit a request to update a temporary user identifier shared within a system; a temporary user identifier update request receiving side device which is connected to the temporary user identifier update request transmitting side device by a network and can receive the update request from the temporary user identifier update request transmitting side device, for providing the second service cooperating with the first service using the updated temporary user identifier; and a user proxy device which is connected to the temporary user identifier update request transmitting side device and the temporary identifier update request receiving side device by the network, and with which the user receives the two services.

10 Claims, 40 Drawing Sheets

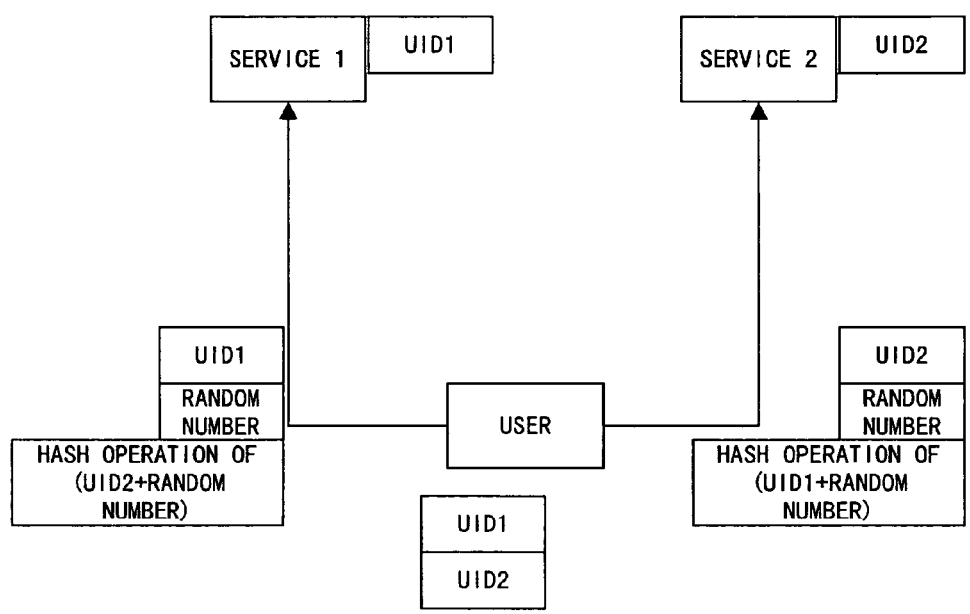
F I G. 4

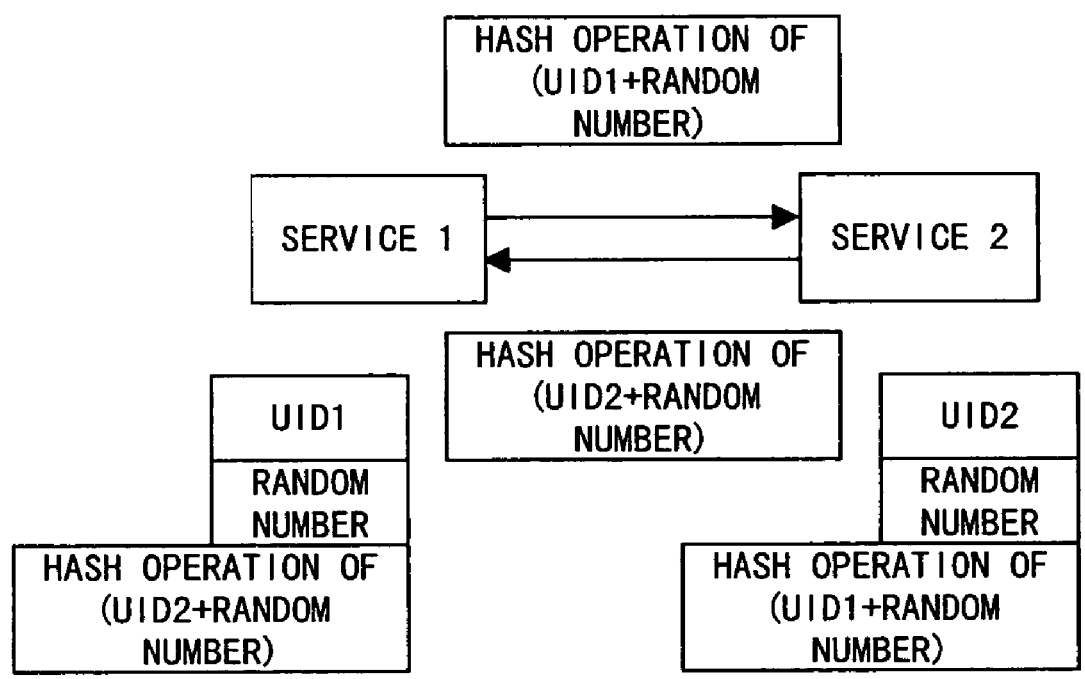
F I G. 5

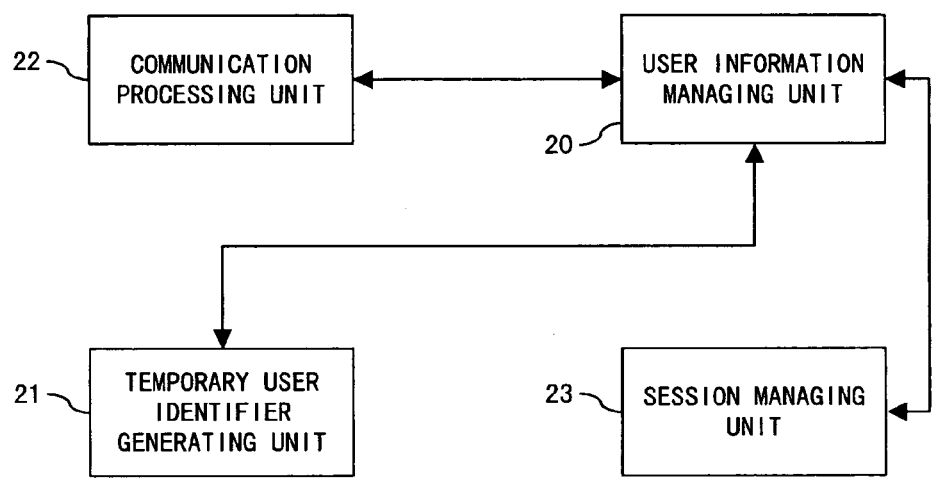
F I G. 7

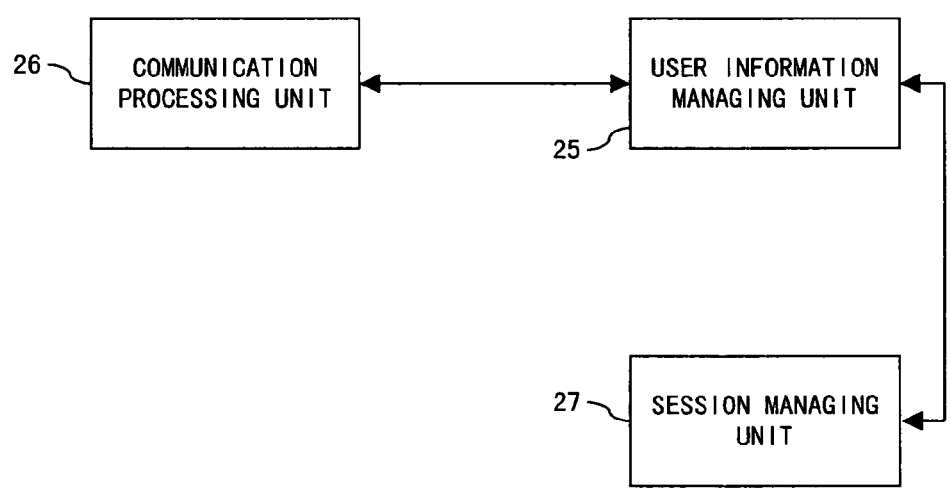
F I G. 8

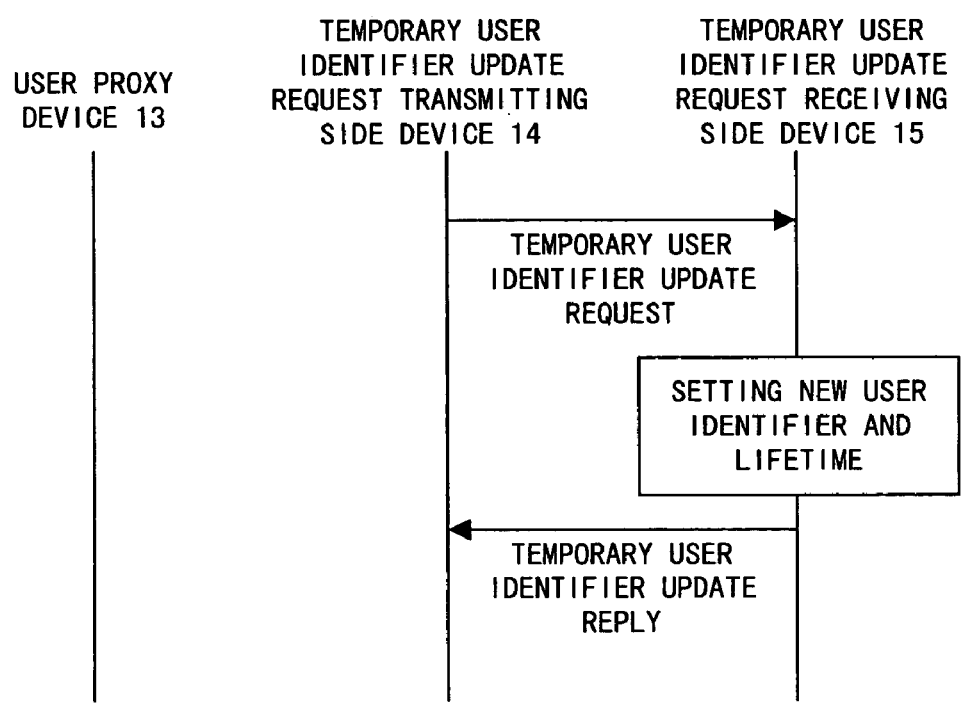
F I G. 1 3

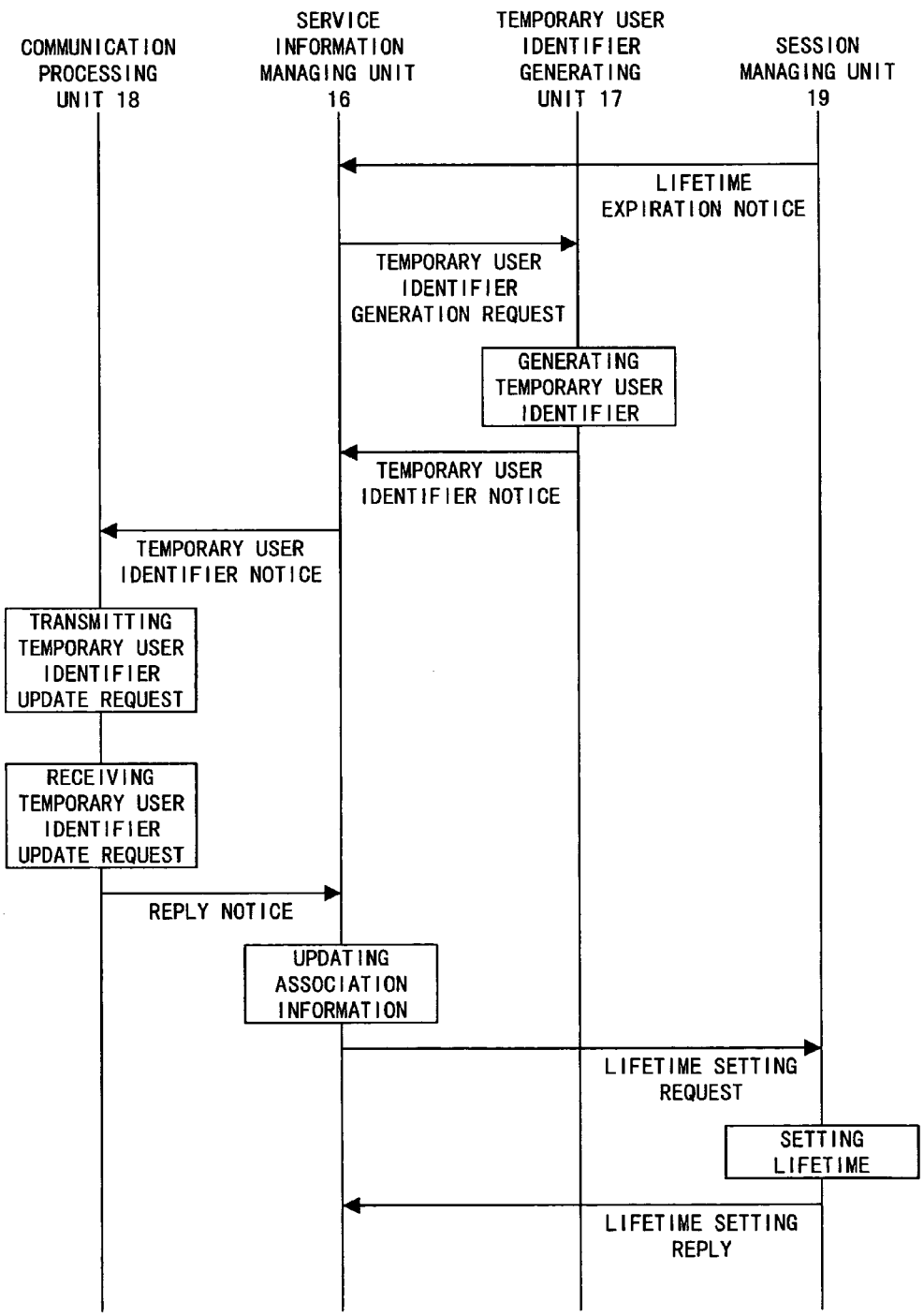
F I G. 1 7

[ACCESS INFORMATION]

| USER IDENTIFIER | SERVICE IDENTIFIER | TEMPORARY USER IDENTIFIER | ACCESS DESTINATION |
|---|---|---|---|
| aaa | zzz | bbb | http://zzz.com/abc |

[INFORMATION TO BE ACCESSED]

| USER IDENTIFIER | SERVICE IDENTIFIER | TEMPORARY USER IDENTIFIER | ACCESS SOURCE |
|---|---|---|---|
| aaa | zzz | eee | http://zzz.com/abc |

[SESSION INFORMATION]

| TEMPORARY USER IDENTIFIER | LIFETIME OF TEMPORARY USER IDENTIFIER |
|---|---|
| bbb | 100 SECONDS |
| eee | 100 SECONDS |

[NOTICE INFORMATION TO USER]

| USER IDENTIFIER | MEANS | IDENTIFICATION INFORMATION |
|---|---|---|
| bbb | E-MAIL | bbb@aaa.com |
| eee | IM | ccc@aaa.com |

FIG. 24

[ACCESS INFORMATION]

| USER IDENTIFIER | SERVICE IDENTIFIER | TEMPORARY USER IDENTIFIER | ACCESS DESTINATION |
|---|---|---|---|
| ggg | xxx | eee | http://xxx.com/abc |

[INFORMATION TO BE ACCESSED]

| USER IDENTIFIER | SERVICE IDENTIFIER | TEMPORARY USER IDENTIFIER | ACCESS SOURCE |
|---|---|---|---|
| ggg | xxx | bbb | http://xxx.com/abc |

[SESSION INFORMATION]

| TEMPORARY USER IDENTIFIER | LIFETIME OF TEMPORARY USER IDENTIFIER |
|---|---|
| bbb | 100 SECONDS |
| eee | 100 SECONDS |

[NOTICE INFORMATION TO USER]

| USER IDENTIFIER | MEANS | IDENTIFICATION INFORMATION |
|---|---|---|
| bbb | E-MAIL | bbb@aaa.com |
| eee | IM | ccc@aaa.com |

FIG. 25

[ACCESS INFORMATION]

| USER IDENTIFIER | SERVICE IDENTIFIER | TEMPORARY USER IDENTIFIER | ACCESS DESTINATION |
|---|---|---|---|
| aaa | zzz | bbb | http://zzz.com/abc |
| ggg | xxx | eee | http://xxx.com/abc |

[INFORMATION TO BE ACCESSED]

| USER IDENTIFIER | SERVICE IDENTIFIER | TEMPORARY USER IDENTIFIER | ACCESS SOURCE |
|---|---|---|---|
| aaa | zzz | eee | http://zzz.com/abc |
| ggg | xxx | bbb | http://xxx.com/abc |

[SESSION INFORMATION]

| TEMPORARY USER IDENTIFIER | LIFETIME OF TEMPORARY USER IDENTIFIER |
|---|---|
| bbb | 100 SECONDS |
| eee | 100 SECONDS |

F I G. 2 6

| MESSAGE TYPE | ACCESS DESTINATION (SERVICE NAME) |
|---|---|
| ASSOCIATION REGISTRATION REQUEST | http://xxx.com/abc |

| USER IDENTIFIER | TEMPORARY USER IDENTIFIER | LIFETIME OF TEMPORARY USER IDENTIFIER | NOTICE MEANS TO USER | USER IDENTIFIER AT TIME OF NOTICE |
|---|---|---|---|---|
| aaa | bbb | 100 SECONDS | E-MAIL | aaa@bbb.com |

FIG. 27

| MESSAGE TYPE | PROCESSING RESULT | LIFETIME OF TEMPORARY USER IDENTIFIER |
|---|---|---|
| ASSOCIATION REGISTRATION REPLY | OK/NG | 100 SECONDS |

FIG. 28

| MESSAGE TYPE | ACCESS DESTINATION (SERVICE NAME) |
|---|---|
| TEMPORARY USER IDENTIFIER UPDATE REQUEST | http://xxx.com/abc |

| OLD TEMPORARY USER IDENTIFIER | NEW TEMPORARY USER IDENTIFIER | LIFETIME OF NEW TEMPORARY USER IDENTIFIER |
|---|---|---|
| aaa | bbb | 100 SECONDS |

FIG. 29

| MESSAGE TYPE | PROCESSING RESULT | LIFETIME OF TEMPORARY USER IDENTIFIER |
|---|---|---|
| TEMPORARY USER IDENTIFIER UPDATE REPLY | OK/NG | 100 SECONDS |

FIG. 30

[ACCESS INFORMATION]

| USER IDENTIFIER | SERVICE IDENTIFIER | ACCESS DESTINATION |
|---|---|---|
| aaa | zzz | http://zzz.com/abc |

[INFORMATION TO BE ACCESSED]

| USER IDENTIFIER | SERVICE IDENTIFIER | TEMPORARY USER IDENTIFIER | ACCESS SOURCE |
|---|---|---|---|
| aaa | zzz | eee | http://zzz.com/abc |

[NOTICE INFORMATION TO USER]

| USER IDENTIFIER | MEANS | IDENTIFICATION INFORMATION |
|---|---|---|
| bbb | E-MAIL | bbb@aaa.com |
| eee | IM | ccc@aaa.com |

FIG. 31

[ACCESS INFORMATION]

| USER IDENTIFIER | SERVICE IDENTIFIER | ACCESS DESTINATION |
|---|---|---|
| ggg | xxx | http://xxx.com/abc |

[INFORMATION TO BE ACCESSED]

| USER IDENTIFIER | SERVICE IDENTIFIER | TEMPORARY USER IDENTIFIER | ACCESS SOURCE |
|---|---|---|---|
| ggg | xxx | bbb | http://xxx.com/abc |

[NOTICE INFORMATION TO USER]

| USER IDENTIFIER | MEANS | IDENTIFICATION INFORMATION |
|---|---|---|
| bbb | E-MAIL | bbb@aaa.com |
| eee | IM | ccc@aaa.com |

FIG. 32

[ACCESS INFORMATION]

| USER IDENTIFIER | SERVICE IDENTIFIER | ACCESS DESTINATION |
|---|---|---|
| aaa | zzz | http://zzz.com/abc |
| ggg | xxx | http://xxx.com/abc |

[INFORMATION TO BE ACCESSED]

| USER IDENTIFIER | SERVICE IDENTIFIER | ACCESS SOURCE |
|---|---|---|
| aaa | zzz | http://zzz.com/abc |
| ggg | xxx | http://xxx.com/abc |

FIG. 33

| MESSAGE TYPE | ACCESS DESTINATION (SERVICE NAME) |
|---|---|
| ASSOCIATION REGISTRATION REQUEST | http://xxx.com/abc |

| USER IDENTIFIER | SERVICE IDENTIFIER | TEMPORARY USER IDENTIFIER | ACCESS SOURCE |
|---|---|---|---|
| aaa | bbb | E-MAIL | aaa@bbb.com |

FIG. 34

| MESSAGE TYPE | PROCESSING RESULT |
|---|---|
| ASSOCIATION REGISTRATION REPLY | OK/NG |

F I G. 3 5

[ACCESS INFORMATION]

| USER IDENTIFIER | SERVICE IDENTIFIER | TEMPORARY USER IDENTIFIER | ACCESS DESTINATION |
|---|---|---|---|
| aaa | zzz | 1234 | http://zzz.com/abc |

[INFORMATION TO BE ACCESSED]

| USER IDENTIFIER | SERVICE IDENTIFIER | TEMPORARY USER IDENTIFIER | ACCESS SOURCE |
|---|---|---|---|
| aaa | zzz | eee | http://zzz.com/abc |

[SESSION INFORMATION]

| RANDOM NUMBER FOR PREPARING TEMPORARY USER IDENTIFIER OR TEMPORARY USER IDENTIFIER | LIFETIME OF RANDOM NUMBER OR TEMPORARY USER IDENTIFIER |
|---|---|
| 1234 | 100 SECONDS |
| eee | 100 SECONDS |

[NOTICE INFORMATION TO USER]

| USER IDENTIFIER | MEANS | IDENTIFICATION INFORMATION |
|---|---|---|
| bbb | E-MAIL | bbb@aaa.com |
| eee | IM | ccc@aaa.com |

FIG. 36

[ACCESS INFORMATION]

| USER IDENTIFIER | SERVICE IDENTIFIER | TEMPORARY USER IDENTIFIER | ACCESS DESTINATION |
|---|---|---|---|
| ggg | xxx | 5678 | http://xxx.com/abc |

[INFORMATION TO BE ACCESSED]

| USER IDENTIFIER | SERVICE IDENTIFIER | TEMPORARY USER IDENTIFIER | ACCESS SOURCE |
|---|---|---|---|
| ggg | xxx | bbb | http://xxx.com/abc |

[SESSION INFORMATION]

| RANDOM NUMBER FOR PREPARING TEMPORARY USER IDENTIFIER OR TEMPORARY USER IDENTIFIER | LIFETIME OF RANDOM NUMBER OR TEMPORARY USER IDENTIFIER |
|---|---|
| 5678 | 100 SECONDS |
| bbb | 100 SECONDS |

[NOTICE INFORMATION TO USER]

| USER IDENTIFIER | MEANS | IDENTIFICATION INFORMATION |
|---|---|---|
| bbb | E-MAIL | bbb@aaa.com |
| eee | IM | ccc@aaa.com |

FIG. 37

[ACCESS INFORMATION]

| USER IDENTIFIER | SERVICE IDENTIFIER | RANDOM NUMBER FOR PREPARING TEMPORARY USER IDENTIFIER | ACCESS DESTINATION |
|---|---|---|---|
| aaa | zzz | 1234 | http://zzz.com/abc |
| ggg | xxx | 5678 | http://xxx.com/abc |

[INFORMATION TO BE ACCESSED]

| USER IDENTIFIER | SERVICE IDENTIFIER | TEMPORARY USER IDENTIFIER | ACCESS SOURCE |
|---|---|---|---|
| aaa | zzz | eee | http://zzz.com/abc |
| ggg | xxx | bbb | http://xxx.com/abc |

[SESSION INFORMATION]

| RANDOM NUMBER FOR PREPARING TEMPORARY USER IDENTIFIER OR TEMPORARY USER IDENTIFIER | LIFETIME OF RANDOM NUMBER OR TEMPORARY USER IDENTIFIER |
|---|---|
| 1234 | 100 SECONDS |
| 5678 | 100 SECONDS |

FIG. 38

| MESSAGE TYPE | ACCESS DESTINATION (SERVICE NAME) |
|---|---|
| ASSOCIATION DELETION REQUEST | http://xxx.com/abc |

| USER IDENTIFIER | TEMPORARY USER IDENTIFIER |
|---|---|
| aaa | bbb |

FIG. 39

| MESSAGE TYPE | PROCESSING RESULT |
|---|---|
| ASSOCIATION DELETION REPLY | OK/NG |

FIG. 40

NETWORK SERVICE SYSTEM USING TEMPORARY USER IDENTIFIER

BACKGROUND OF THE INVENTION

1. Field of the Invention

The present invention relates to a service system using a network and more particularly, it relates to a method for managing a user identifier in a network service system where a plurality of services is cooperatively provided to a user.

2. Description of the Related Art

The present invention targets a field where a plurality of services are cooperatively provided to a user or a field where diverse services are provided by individually dividing among different providers or by cooperating with each other. Specific examples include a service called a ubiquitous service, etc. As such a service, there is network service business which provides a service by embedding a function existing on every daily life scene, for example, a terminal, etc. into a portion of a service via a network function. This business is fundamentally different from business such that a service is received by carrying an existing mobile function such as a notebook computer.

An existing network service typified by a cellular phone has features (restrictions) firstly that a service originating device and an accepting device are the same, secondly that a user must carry an appliance such as a cellular phone, a notebook computer, etc., which are prepared by the user by being purchased, in order to receive a service.

In the meantime, an idea called ubiquitous computing has been proposed since the latter half of the '80s and has attracted attention in recent years. Since the feature of ubiquitous computing is diversely interpreted by many persons at present there is no unique definition. As one interpretation, a system assisting diverse daily target actions by using a function (computer, etc.) existing on the scene is considered.

In the meantime, in a current mobile service, functions of portable terminals have been improving at an accelerating pace. However, their operations become complex and the prices of the terminals increase due to the sophisticated functions in addition to the physical limitations of the terminals (such as the size and weight of a main body or a display device). Therefore, functions which are not used or cannot be used by most of general users are installed in many cases. In the meantime, the ubiquitous service is characterized in that a function (device) existing on the scene is tentatively used and a user need not possess a function (such as a notebook computer) for achieving an object.

In addition, in respect of an existing network system, the function (acceptance point) of a service is a user terminal itself if it is viewed from the user terminal. Therefore, a sufficient technique for temporarily using an appliance without use right or possession right, namely, a technique for connecting appliances that are managed by the different providers while hiding the privacies of providers and users is demanded.

The achievement of the above described object requires a method for permitting the possessor (contractor) of a portable terminal to use a device (a display device, etc., available to the pubic) the property right of which is not directly owned by the possessor and which is managed by a third person, etc. At this time, when a service is configured via a plurality of providers, personal information about the contractor of the terminal starting the service is held and managed by a provider (such as a network connecting provider) that directly makes a contract with the user of the terminal. Therefore, it is difficult to pass this personal information to an external provider without the permission of the contactor (mainly due to the memorandum of contract). Besides, it is sufficient for a provider that manages a device of the terminal responsible for the above described service to receive only an instruction of operations. Accordingly, it is assumed that the personal information of a terminal user who starts the service is not always required.

In the above described network service system, how to restrict the personal information to be shared and propagated among providers in the personal information of a user who starts a service must be controlled regardless of how much a provider terminating the service requires the personal information of the user. In recent years, also a mechanism with which providers having diverse roles divide a function to configure a service has been proposed. With such a mechanism, however, there is a problem that a privacy control among providers, namely, a technique for hiding information, which is intended to make an individual unidentifiable, does not exist.

Generally, a basic method for identifying an individual on a network or a computer is to assign an identifier to each individual. However, if a common identifier is used among providers, the personal information of a contractor can possibly propagate up to a provider to whom the contractor does not want to disclose his or her personal information. Accordingly, a technique with which each provider defines and manages a specific identifier system for a user targeted by each provider, the identifier of a user who starts a service is hidden among individual providers connected with and the user who starts the service cannot be traced from execution information of the service is required.

The following documents describe conventional techniques for securing the safety of a communication or for managing personal information in a communication system or a service system.

[Patent Document 1] Japanese Unexamined Patent Application Publication No. 6-85811 "Method and System for Enabling Communications via Switch Network, Method Providing Safety Function to Safety Node and Switch Network, Method for Processing Encrypted Communications and Method for Providing Safety Communications"

[Patent Document 2] Japanese Unexamined Patent Application Publication No. 2003-345724 "Information Management Method, Information Management System, Server, Terminal and Information Management Program"

[Patent Document 3] Japanese Unexamined Patent Application Publication No. 7-170256 "Method for Authenticating Communication Partner and Encrypted Communication Device Using this Method"

[Patent Document 4] Japanese Unexamined Patent Application Publication No. 2002-268950 "Information Management System, Information Management Method, Information Processing Device, Information Processing Method and Program"

[Patent Document 5] Japanese Unexamined Patent Application Publication No. 2003-178022 "Identification Information Issuing Device and Method, Storage Medium stored Identification Information Issuing Program, Identification Information Issuing Program, Information Processing Device and Method, Storage Medium stored Information Processing Program and Information Processing Program"

[Patent Document 6] U.S. Pat. No. 5,790,667 "Personal Authentication Method"

Patent Document 1 discloses a method for providing a safety communication by arranging a safety node which converts information encrypted in one format into information encrypted in another format or non-encrypted information and performs reverse conversion, in an electric communication network.

Patent Document 2 discloses an information managing method for making an inquiry to a person who receives a service, for classifying persons who receive services into groups, for protecting the privacies of the persons who receive the services as much as possible and for properly coping with changes in the circumstances of the persons who receive the services.

Patent Document 3 discloses a method for safely authenticating a communication partner by transmitting information prepared using the encryption key distributed from a center.

Patent document 4 discloses an information management system for protecting the privacy of a client by registering the client's information as a secret identifier that changes as time passes and by disclosing this secret identifier only to a specific retrieval client.

Patent document 5 discloses an identifier information issuing method for specifying a user by a service provider without using information such as appliance ID by using the ID for SP that is prepared by a management server, thereby reducing the burden of a service provider.

Patent document 6 discloses a method for authenticating information regarding an authenticated person transmitted from an authenticated station while the first and second authenticating stations cooperate with each other.

With such conventional techniques, however, there is a problem such that it is impossible to hide personal information, especially, a user identifier and to make a user unidentifiable from execution information of a service when a plurality of services cooperatively implements operations. In addition, there is a problem that there is no way to prevent the damage from spreading, thereby protecting the security of user in the case where user information leaks.

SUMMARY OF THE INVENTION

An object of the present invention is to hide a temporary user identifier in each service and enhance the safety of user information among a plurality of services to be cooperatively executed and to prevent the damage from spreading, thereby protecting the security of user information in the case where user information leaks.

In one of the preferred embodiments of the present invention, it is based on the premise that a network service system is in which the information of a user who uses a plurality of services is shared by the plurality of services. This system comprises: a temporary user identifier update request transmitting side device for providing the first service to the user, which can transmit a request to update a temporary user identifier shared within the network service system as information of the user; a temporary user identifier update request receiving side device which is connected to the temporary user identifier update request transmitting side device by a network and which can receive the update request of a temporary user identification transmitted from the transmitting side device, for providing the second service cooperating with the first service to a user using the temporary user identifier updated corresponding to the update request; and a user proxy device which is connected to the temporary user identifier update request transmitting side and receiving side devices by the network and with which the user receives the first and second services.

The user proxy device generates temporary user identifiers using a random number corresponding to user identifiers of a user for services provided in each of the temporary user identifier update request transmitting side device and the temporary user identifier update request receiving side device, and it transmits to the temporary user identifier update request transmitting side device and the temporary user identifier update request receiving side device the association registration request message including the generated temporary user identifier and notice information to a user, which is used when the association is deleted before a valid time period of the generated temporary user identifier expires. Then, each of the temporary user identifier update request transmitting side device and the temporary user identifier update request receiving side device transmits the association reply message to a side of the user proxy device after each of the temporary user identifier update request transmitting side device and the temporary user identifier update request receiving side device sets the temporary user identifier, a valid time period of the temporary user identifier and notice information to the user.

In this way, it becomes possible to prevent the damage from spreading and enhance the safety of user information by making the user on a partner side unspecified among a plurality of services, by periodically updating a temporary user identifier for this cooperate operation and by invalidating the temporary user identifier in the case where personal information of the user leaks.

BRIEF DESCRIPTION OF THE DRAWINGS

FIG. 4 explains the generation of a temporary user identifier in association registration;

FIG. 5 explains the cooperative operation of a plurality of service devices;

FIG. 7 is a block diagram exemplifying the configuration of a temporary user identifier update request transmitting side device;

FIG. 8 is a block diagram exemplifying the configuration of a temporary user identifier update request receiving side device;

FIG. 13 explains the whole of a temporary user identifier update sequence in accordance with a request from the temporary user identifier update request transmitting side device;

FIG. 17 shows a temporary user identifier update process sequence in the user proxy device;

FIG. 24 explains information stored in the temporary user identifier update request transmitting side device (when a random number value is used for a temporary user identifier);

FIG. 25 explains information stored in the temporary user identifier update request receiving side device (when a random number value is used for a temporary user identifier);

FIG. 26 explains information stored in the user proxy device (when a random number value is used for a temporary user identifier);

FIG. 27 explains information included in the association registration request message (when a random number value is used for a temporary user identifier);

FIG. 28 explains information included in the association registration reply message (when a random number value is used for a temporary user identifier);

FIG. 29 explains information included in a temporary user identifier update request message (when a random number value is used for a temporary user identifier);

FIG. 30 explains information included in a temporary user identifier update reply message (when a random number value is used for a temporary user identifier);

FIG. 31 explains information stored in the temporary user identifier update request transmitting side device (when an irreversible operation value is used for a temporary user identifier and the temporary user identifier is not updated);

FIG. 32 explains information stored in the temporary user identifier update request receiving side device (when an irreversible operation value is used for a temporary user identifier and the temporary user identifier is not updated);

FIG. 33 explains information stored in the user proxy device (when an irreversible operation value is used for a temporary user identifier and the temporary user identifier is not updated);

FIG. 34 explains information included in the association registration request message (when an irreversible operation value is used for a temporary user identifier and the temporary user identifier is not updated);

FIG. 35 explains information included in the association registration reply message (when an irreversible operation value is used for a temporary user identifier and the temporary user identifier is not updated);

FIG. 36 explains information stored in the temporary user identifier update request transmitting side device (when an irreversible operation value is used for a temporary user identifier and the temporary user identifier is updated);

FIG. 37 explains information stored in the temporary user identifier update request receiving side device (when an irreversible operation value is used for a temporary user identifier and the temporary user identifier is updated);

FIG. 38 explains information stored in the user proxy device (when an irreversible operation value is used for a temporary user identifier and the temporary user identifier is updated);

FIG. 39 explains information included in the association deletion request message; and FIG. 40 explains information included in the association deletion reply message.

DESCRIPTION OF THE PREFERRED EMBODIMENTS

Figure 1:
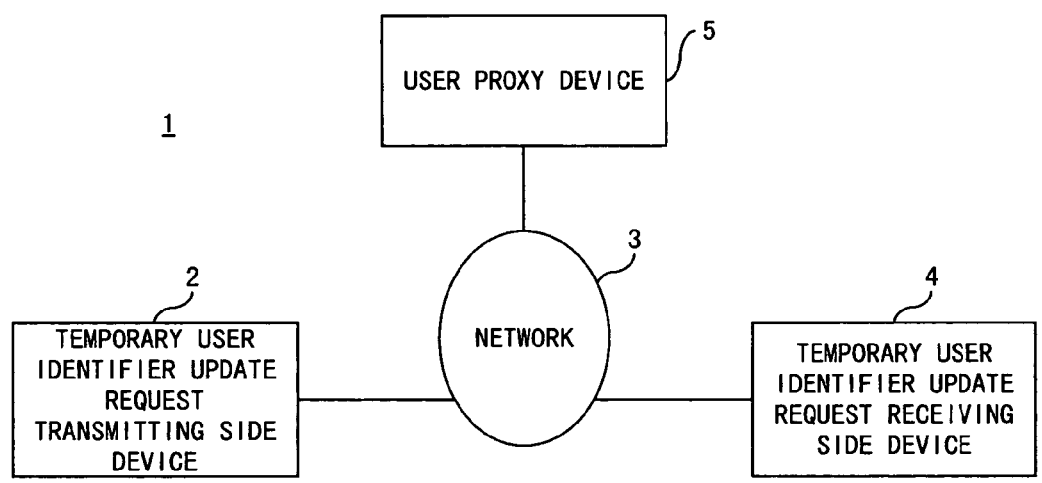
FIG. 1 is a block diagram showing the principle of a configuration of a network service system according to the present invention.

FIG. 1 is a block diagram showing the principle of a configuration of a network service system according to the present invention. This figure is a block diagram showing the principle of the configuration of the network service system where information about a user who uses a plurality of services is shared by the plurality of services. A system 1 includes a temporary user identifier update request transmitting side device 2, a temporary user identifier update request receiving side device 4 and a user proxy device 5, which are interconnected by a network 3.

The temporary user identifier update request transmitting side device 2 is a device for providing a first service to a user. This device can transmit a request to update a temporary user identifier which is shared within the network service system, as user information. The temporary user identifier update request receiving side device 4 is a device which can receive the request to update the temporary user identifier which is transmitted from the temporary user identifier update request transmitting side device 2. This device provides a second service which cooperates with the above described first service to a user using the temporary user identifier updated corresponding to the update request.

The user proxy device 5 is connected to the temporary user identifier update request transmitting side device 2 and the temporary user identifier update request receiving side device 4 by the network. With this device, a user receives the above described first and second services.

In a preferred embodiment according to the present invention, the user proxy device 5 comprises a service information managing unit for storing a user identifier, etc. in a service received by a user, a temporary user identifier generating unit for generating a temporary user identifier corresponding to each user identifier and a communication processing unit for transmitting a message which includes a pair of the user identifier and the temporary user identifier to the temporary user identifier update request transmitting side device 2 and the temporary user identifier update request receiving side device 4.

The temporary user identifier update request transmitting side device 2 comprises a communication processing unit for receiving the message which is transmitted from the user proxy device 5 and includes the pair of a user identifier corresponding to the first service and a temporary user identifier, a session managing unit for managing the valid time period of the temporary user identifier, a temporary user identifier generating unit for generating a new temporary user identifier before the valid time period of the user identifier expires and a user information management unit for managing the information to be notified to a user. The communication processing unit transmits a temporary user identifier update request which includes the new temporary user identifier, to the temporary user identifier update request receiving side device 4. In the case where the temporary user identifier becomes invalid, the communication processing unit notifies this fact to the user proxy device 5 using the information which is notified to the user.

Furthermore, the temporary user identifier update request receiving side device 4 comprises: a communication processing unit for receiving the message which is transmitted from the user proxy device 5 and includes a pair of a user identifier and a temporary user identifier corresponding to the second service, and a temporary user identifier update request which is transmitted from the temporary identifier update request transmitting side device 2; a session managing unit for managing a new temporary user identifier and its valid time period corresponding to the temporary user identifier update request; and a user information managing unit for managing a method for notifying to a user. In the case where the temporary user identifier becomes invalid, the temporary user identifier update request receiving side device 4 notifies this fact to the user proxy device 5 using information to be notified to the user.

Additionally, the preferred embodiment uses the following sequence. The user proxy device 5 generates a temporary user identifier corresponding to the user identifiers of a user respectively for the temporary user identifier update request transmitting side device 2 and the temporary user identifier update request receiving side device 4 and it transmits the association registration request message which includes the generated temporary user identifier and its valid time period to each of these two devices. Then, each of these two devices transmits the association reply message to the user proxy device 5 after setting the temporary user identifier and its valid time period and the user proxy device 5 sets the valid time period of the above described generated temporary user identifier after receiving the association reply messages from the two devices.

Furthermore, the above described network service system uses the following sequence. The temporary user identifier update request transmitting side device 2 generates a new temporary user identifier before the valid time period of the temporary user identifier shared within the network service system expires and it transmits a temporary user identifier update request including the generated temporary user identifier and its valid time period to the temporary user identifier update request receiving side device 4. Then, the receiving side device 4 transmits a temporary user identifier update reply message to the temporary user identifier update request transmitting side device 2 after setting the new temporary user identifier corresponding to the update request.

In the preferred embodiment, the user proxy device 5 or the temporary user identifier update request transmitting side device 2 can generate a temporary user identifier using a random number corresponding to the user identifier, or it can generate a temporary user identifier using an irreversible operation, in these two sequences.

In the preferred embodiment, when terminating the reception of, for example, a service, the user proxy device 5 transmits association deletion request messages to the temporary user identifier update request transmitting side device 2 and the temporary user identifier update request receiving side device 4. Then, each of the devices deletes a pair of a temporary user identifier for the user and a user identifier as association information. Furthermore, the following sequence is performed. The device retrieves whether or not the user identifier included in the received request is associated with another temporary user identifier. In the case where there is no association, the device deletes the information to be notified to a user corresponding to the user identifier and returns the association deletion reply message.

In another preferred embodiment, the following sequence is performed. The temporary user identifier update request transmitting side device 2 or the temporary user identifier update request receiving side device 4 is configured to be able to detect the leak of personal information of a service user and a request for the deletion of the association is made by the device which detects the leak. The device that receives the request deletes a pair of a temporary user identifier corresponding to the user and a user identifier as the association information and then it returns the association deletion reply message, thereby transmitting the association deletion notice to the user proxy device 5.

A network service system according to the present invention is a device for receiving a plurality of services that are cooperatively executed. The system comprises: a user proxy device for generating a temporary user identifier corresponding to each user identifier in the plurality of services and for transmitting the generated temporary user identifier to the side of each of the devices providing the respective services; and a plurality of temporary user identifier update request receiving side devices which are connected to the user proxy device by a network, for providing the respective services cooperatively executed to the user and for providing the services to the user using the temporary user identifier transmitted from the user proxy device.

In the preferred embodiment according to the present invention, the user proxy device can comprise: a session managing unit for managing the valid time period of a temporary user identifier; a temporary user identifier generating unit for generating a new temporary user identifier before the valid time period of the temporary user identifier expires; and a communication processing unit for transmitting a temporary user identifier update request to a plurality of temporary user identifier update request receiving side devices using the generated new temporary user identifier.

Figure 2:
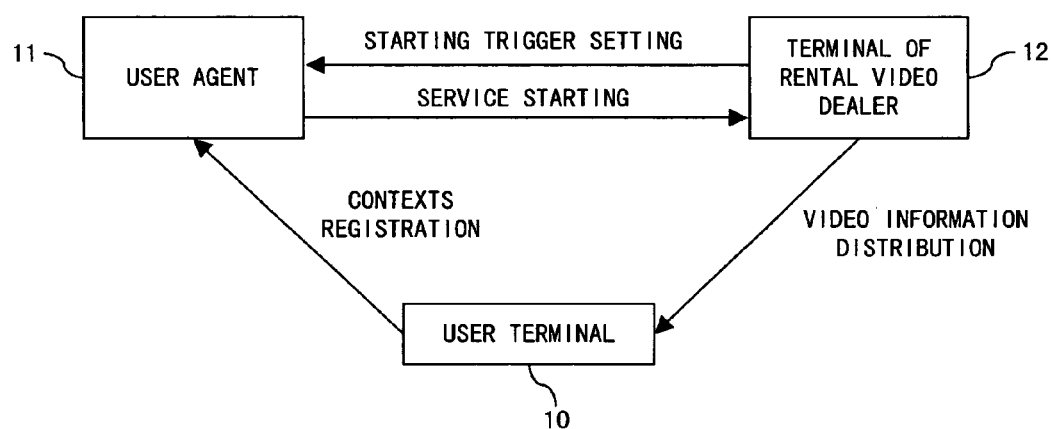
FIG. 2 exemplifies the configuration of the network service system where a temporary user identifier is used.

FIG. 2 exemplifies a configuration of a network system where the temporary user identifier of a user is used among service systems when the user uses a plurality of services. This figure assumes that the user registers a context, etc. from a user terminal 10 to a user agent 11 such as an Internet service provider (ISP) 11 together with a user identifier for using the user agent 11 and also he or she registers a user identifier for receiving video information, etc. to a rental video dealer terminal 12. Here, the user identifier for the user agent 11 and the user identifier for the rental video dealer terminal 12 may be identical or different. However, it is a premise that the user agent 11 and the rental video dealer terminal 12 do not know the user identifier on the partner side respectively.

The context registered in the user agent 11 includes various items of information about the user such as a person related to the user at the current time point, an object such as goods, a place, etc., a state of the user (working, etc.), circumstances, a history, a future schedule, etc.

The rental video dealer terminal 12 sets a starting trigger for the user agent 11. This starting trigger is a setting of a starting condition under which the rental video dealer terminal 12 provides a service such as video information distribution, etc. to the user terminal 10. For example, if the user desires that video information is distributed at a time when he or she arrives at a station close to his or her home after finishing the job, such a condition is set as a starting trigger for the user agent 11.

The user agent 11 instructs the rental video dealer terminal 12 to start the service at a time when such a starting condition is satisfied, namely, a time when the user arrives at the station close to his or her home. The rental video dealer terminal 12 receives from the user agent 11 the information of the context that the user registers in the user agent 11, selects video information in which the user seems to be interested from the past use history, etc. of the user at that store and distributes the selected video information to the user terminal 10.

Here, the user terminal 10 respectively registers the user identifiers in the user agent 11 and the rental video dealer terminal 12. However, the user side can naturally receive video information distributed from the rental video dealer terminal 12 by registering the user identifier only in the user agent 11, by further registering, for example, a genre, etc. of a video in which the user is interested as the contents of the context and by notifying the user agent 11 side that the user desires the distribution of such video information from the rental video dealer terminal 12 side, without registering the user identifier in the rental video dealer terminal 12 side.

In any case, in this preferred embodiment, the user identifier/identifiers registered in the user agent 11 and/or in the rental video dealer terminal 12 is/are user identifiers between the user terminal 10 and the user agent 11 or between the user terminal 10 and the rental video dealer terminal 12. In data exchange, etc. between the user agent 11 and the rental video dealer terminal 12, a temporary user identifier is set without using the user identifiers and then the temporary user identifier is used so that the user agent 11 and the rental video dealer terminal 12 cooperate to provide a service to the user.

Figure 3:
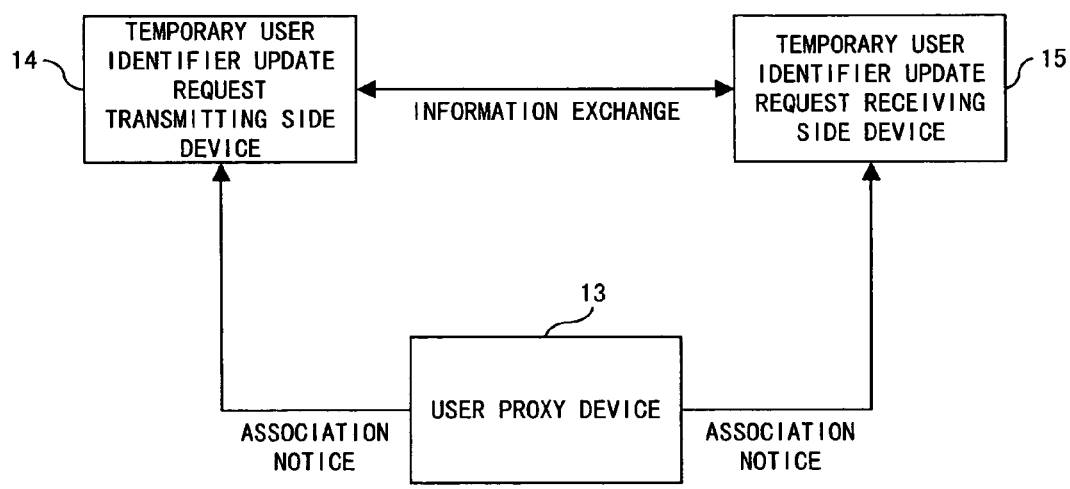
FIG. 3 exemplifies a configuration of the general network service system according to a preferred embodiment.

FIG. 3 shows a configuration example of a more general network system in a preferred embodiment which is the premise of the present invention and corresponds to the specific example shown in FIG. 2. In this figure, a user proxy device 13 corresponding to the user terminal 10 shown in FIG. 2 is connected via a network to a temporary user identifier update request transmitting side device 14 and a temporary user identifier update request receiving side device 15 which are also connected via the network.

The temporary user identifier update request transmitting side device 14 corresponds, for example, to the user agent 11 shown in FIG. 2 while the temporary user identifier update request receiving side device 15 corresponds to the rental video dealer terminal 12. A data exchange, etc. is made by using a temporary user identifier between the user agent 11 and the rental video dealer terminal 12 as described above. As will be described later, a lifetime is set for the temporary user identifier, the temporary user identifier is updated before the lifetime expires and then the updated temporary user identifier is used.

In FIG. 3, the temporary user identifier update request transmitting side device 14 and the temporary user identifier update request receiving side device 15 are named for the convenience of explanation. Generally, which of these two units makes an update request depends on a case. In that sense, both of the user agent 11 and the rental video dealer terminal 12 which are shown in FIG. 2 are realized as a device which can transmit/receive an update request. Here, a preferred embodiment according to the present invention is described by assuming that one of the two devices is the transmitting side device 14 while the other is the receiving side device 15 for the sake of a later explanation. However, in principle, the transmitting side device 14 and the receiving side device 15 are not managed by the same manager but by different managers.

In FIG. 3, the user proxy device 13 makes the association registration in the temporary user identifier update request transmitting side device 14 and the temporary user identifier update request receiving side device 15. With the association registration, a pair of a user identifier and a temporary user identifier is respectively registered, for example, in a service 1 provided by the transmitting side device 14 and a service 2 provided by the receiving side device 15 when the services are started.

FIG. 4 explains a registration example of a user identifier and a temporary user identifier in the association registration. Assume that a user respectively registers UID1 and UID2 as an original user identifier in the service 1 and an original user identifier in the service 2. The user generates a temporary user identifier corresponding to a service which is provided in such way that the service 1 and 2 cooperate, and notifies the sides of the services of the temporary user identifier.

As the temporary user identifier, only a random number may be used as will be described later. Here, the temporary user identifier is generated using a hash operation as an irreversible operation. For example, the user notifies the service 1 of the original user identifier UID1, a random number and a temporary user identifier pairing with the user identifier and the random number. The random number notified here is used to access the service 2. For the generation of the temporary user identifier, the original user identifier UID2 of the user for the service 2 and a random number are used. Namely, the hash operation is performed for a concatenation of UID2 and the random number, and its result is notified to the service 1 side as a temporary user identifier. The random number may be identical to or different from the random number notified to the service 1 along with UID1.

To the service 2, a combination of the original user identifier UID2, a random number and the temporary user identifier is notified. As the temporary user identifier, a result of the hash operation which is performed for a concatenation of the original user identifier UID1 corresponding to the service 1 and the random number is notified.

FIG. 5 explains a method using a temporary user identifier in a cooperative operation of the services 1 and 2. For example, the service 1 side performs a hash operation for the concatenation of the original user identifier UID1 corresponding to the service 1 and the random number, and uses its result as a temporary user identifier in a data exchange, etc. required by the cooperative operation with the service 2. The temporary user identifier is notified from the user to the service 2 side and then the service 2 side can identify the user with the temporary user identifier. Similarly, from the service 2 side to the service 1 side, a result of the hash operation for the concatenation of UID2 and the random number is used as a temporary user identifier. With this temporary user identifier, the service 1 side can identify the user.

Figure 6:
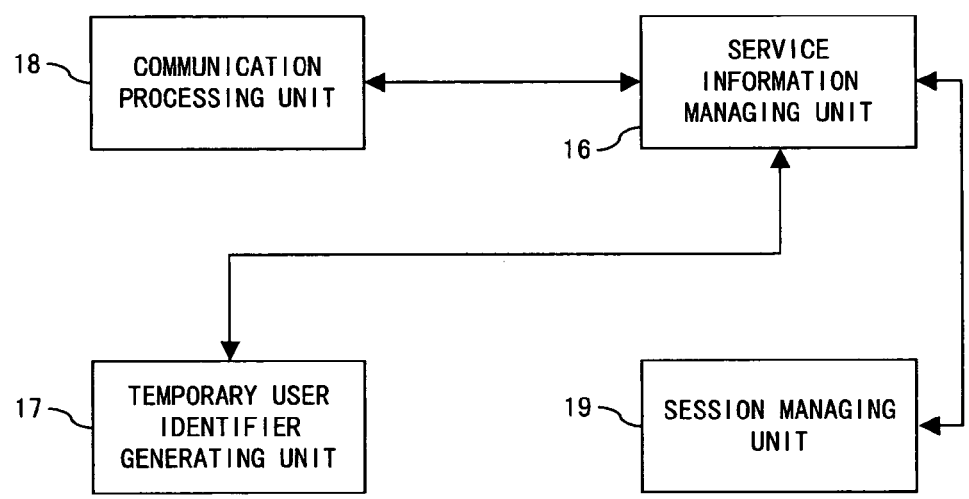
FIG. 6 is a block diagram exemplifying the configuration of a user proxy device.

FIG. 6 is a block diagram exemplifying a configuration of the user proxy device 13 shown in FIG. 3. In this figure, the user proxy device 13 comprises a service information managing unit 16 for managing an identifier of a service provided by the update request transmitting side device 14 or the update request receiving side device 15 which is shown in FIG. 3 and an address of the unit 14 or 15; a temporary user identifier generating unit 17 for generating a temporary user identifier used in the association registration, etc. when a service starts; a communication processing unit 18 for communicating with the two units 14 and 15; and a session managing unit 19 for managing the lifetime of a temporary user identifier, for example, when the temporary user identifier is forcibly updated by the user proxy device 13 side. Note that a session means the valid time period of a temporary user identifier.

FIG. 7 is a block diagram showing a configuration of the temporary user identifier update request transmitting side device 14 shown in FIG. 3. This device comprises a user information managing unit 20 for managing, for example, a pair of a user identifier and a temporary user identifier of each user for each service; a temporary user identifier generating unit 21 for generating a temporary user identifier when the temporary user identifier is updated; a communication processing unit 22 for communicating with the update request receiving side device 15 and the user proxy device 13; and a session managing unit 23 for managing the lifetime of the temporary user identifier.

FIG. 8 is a block diagram showing a configuration of the temporary user identifier update request receiving side device 15. In this figure, the receiving side device 15 comprises a user information managing unit 25; a communication processing unit 26 for communicating with the user proxy device 13 and the update request transmitting side device 14; and a session managing unit 27 for managing the lifetime of a set temporary user identifier in a similar manner as in FIG. 7.

Figure 9:
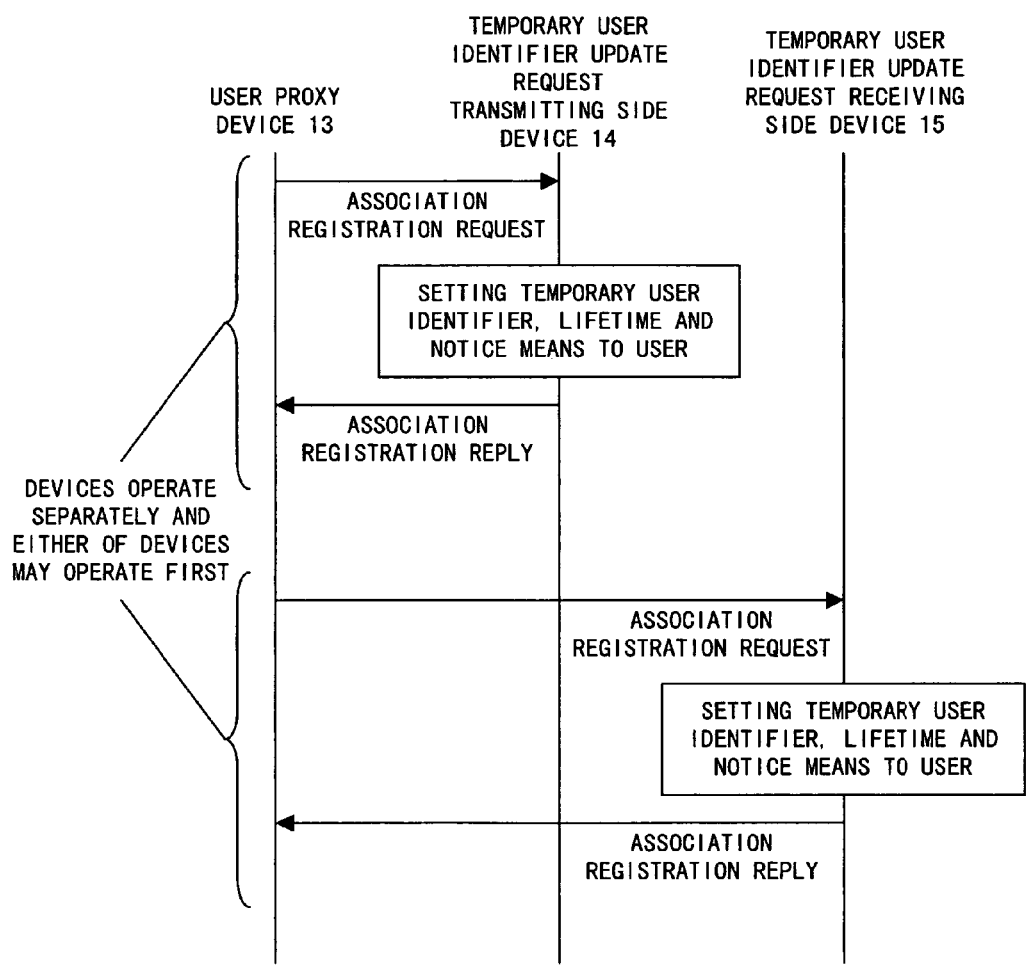
FIG. 9 shows a sequence of the association registration process.

The following is the explanation of the sequences of processes executed among the respective devices shown in FIG. 3 with reference to FIGS. 9 to 23. FIG. 9 shows a sequence of the association registration process. In this figure, the use proxy device 13 makes the association registration request to the temporary user identifier update request transmitting side device 14 and the temporary user identifier update request receiving side device 15. Each of these devices sets a temporary user identifier, its lifetime and notice information to a user corresponding to the association registration request and it makes the association registration reply to the user proxy device 13. Meanwhile, it is also possible that the lifetime is managed in the user proxy device 13 without including the lifetime in the association registration request and the user proxy device 13 makes a temporary user identifier update request or it is possible that the temporary user identifier update request transmitting side device 14 manages the lifetime and this unit makes a temporary user identifier update request. Contents of the registration request, the registration reply messages and the temporary user identifier update request will be described later.

Here, the processes of the association registration between the user proxy device 13 and the temporary user identifier update request transmitting side device 14 is independent from that between the user proxy device 13 and the temporary user identifier update request receiving side device 15, and these processes may be basically executed at the same time. In the case where either of the two processes is executed in advance, the order is out of question.

Figure 10:
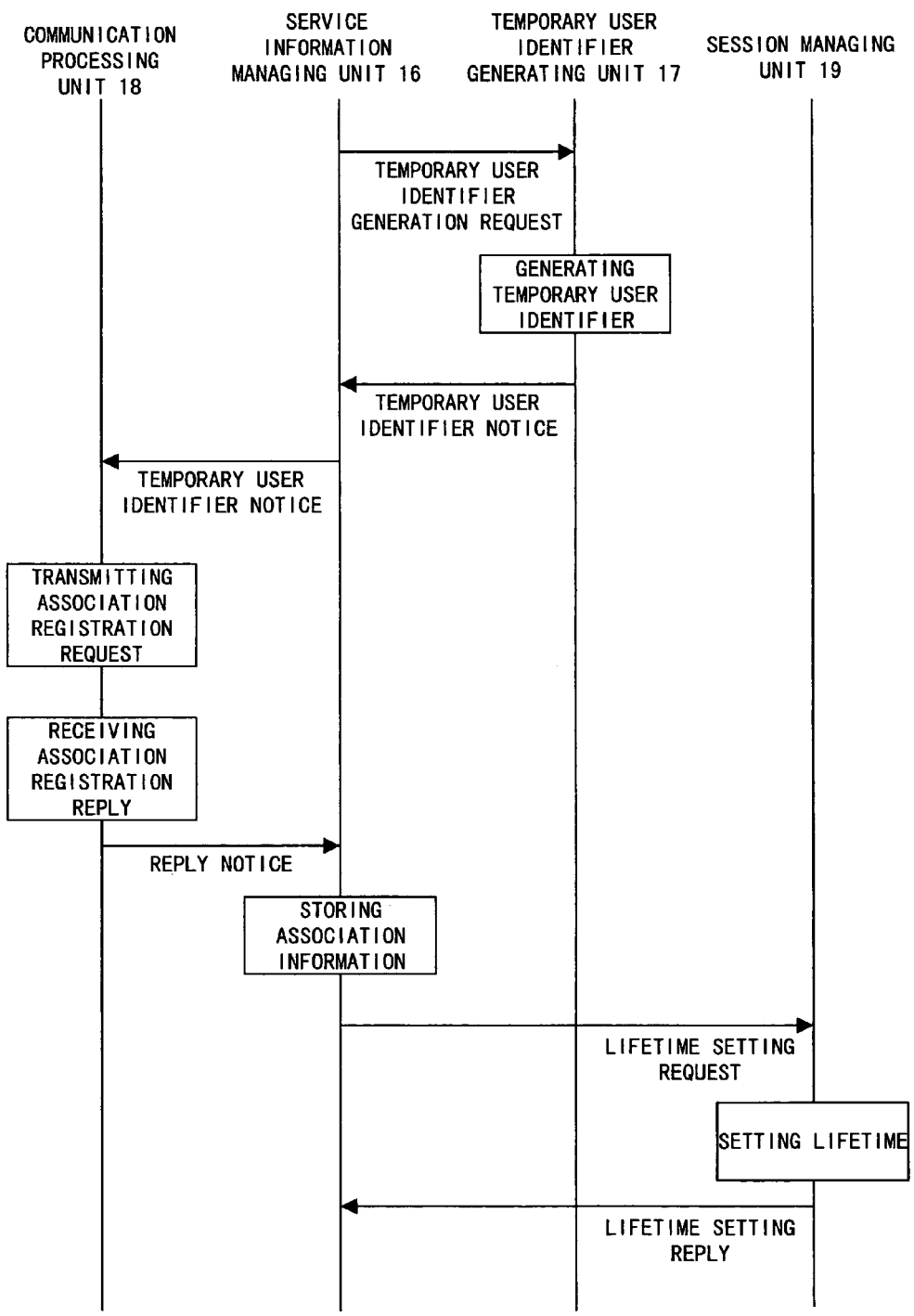
FIG. 10 shows a sequence of the association registration process executed in the user proxy device.

FIG. 10 shows a sequence of the association registration process executed in the user proxy device 13. In this figure, a temporary user identifier generation request is made from the service information managing unit 16 to the temporary user identifier generating unit 17. The generated temporary user identifier is notified from the temporary user identifier generating unit 17 to the communication processing unit 18 via the service information managing unit 16. Then, the association registration request is transmitted from the communication processing unit 18 to each of the update request transmitting side device 14 and the update request receiving side device 15. In response to the registration requests, association registration replies transmitted from the two devices are received by the communication processing unit 18.

Corresponding to these replies, association information, etc. is stored in a memory, etc. by the service information managing unit 16 and a request to set the lifetime of the generated temporary user identifier is made to the session managing unit 19. Then, the value of the set lifetime is stored in the memory, etc., by the session managing unit 19 and a reply to the request is notified to the service information managing unit 16. The reason why the lifetime is not simultaneously set for the generated temporary user identifier before the association registration request is transmitted is that the lifetime is set after a reply which approves the use of the temporary user identifier is received from the update request transmitting side device 14 and the update request receiving side device 15 as the association registration reply.

Figure 11:
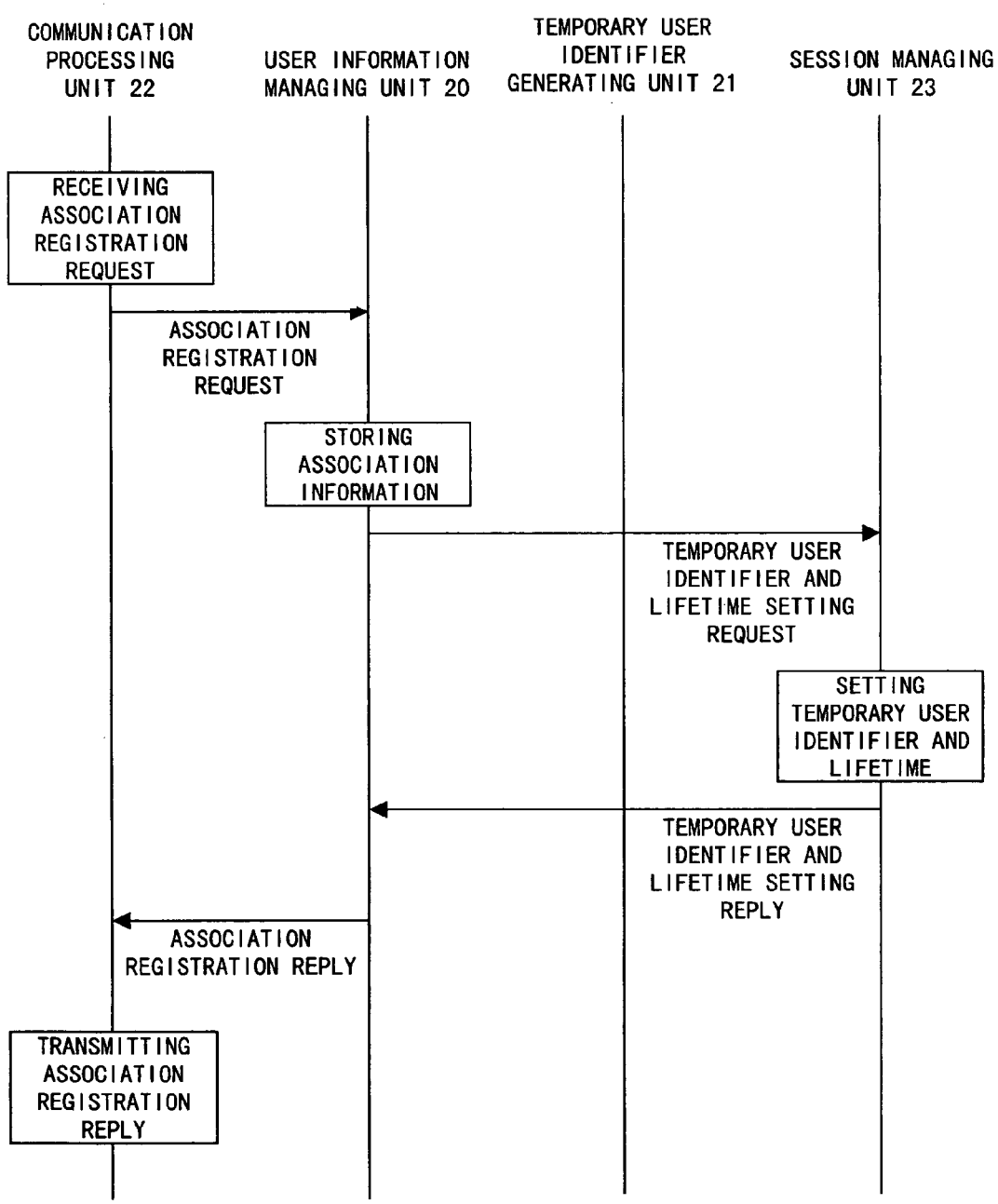
FIG. 11 shows a sequence of the association registration process executed in the temporary user identifier update request transmitting side device.

FIG. 11 shows a sequence of the association registration process executed in the temporary user identifier update request transmitting side device. In this figure, the association registration request transmitted from the user proxy device 13 is received by the communication processing unit 22, this request is notified to the user information managing unit 20, association information is stored, for example, in a memory and a lifetime setting request is made from the user information managing unit 20 to the session managing unit 23. Then, a temporary user identifier and the value of its lifetime which are included, for example, in the association registration request message, are stored in the memory, etc., its setting reply is notified to the user information managing unit 20, an instruction of the association registration reply is made from the user information managing unit 20 to the communication processing unit 22 and the association registration reply to the user proxy device 13 side is transmitted.

Figure 12:
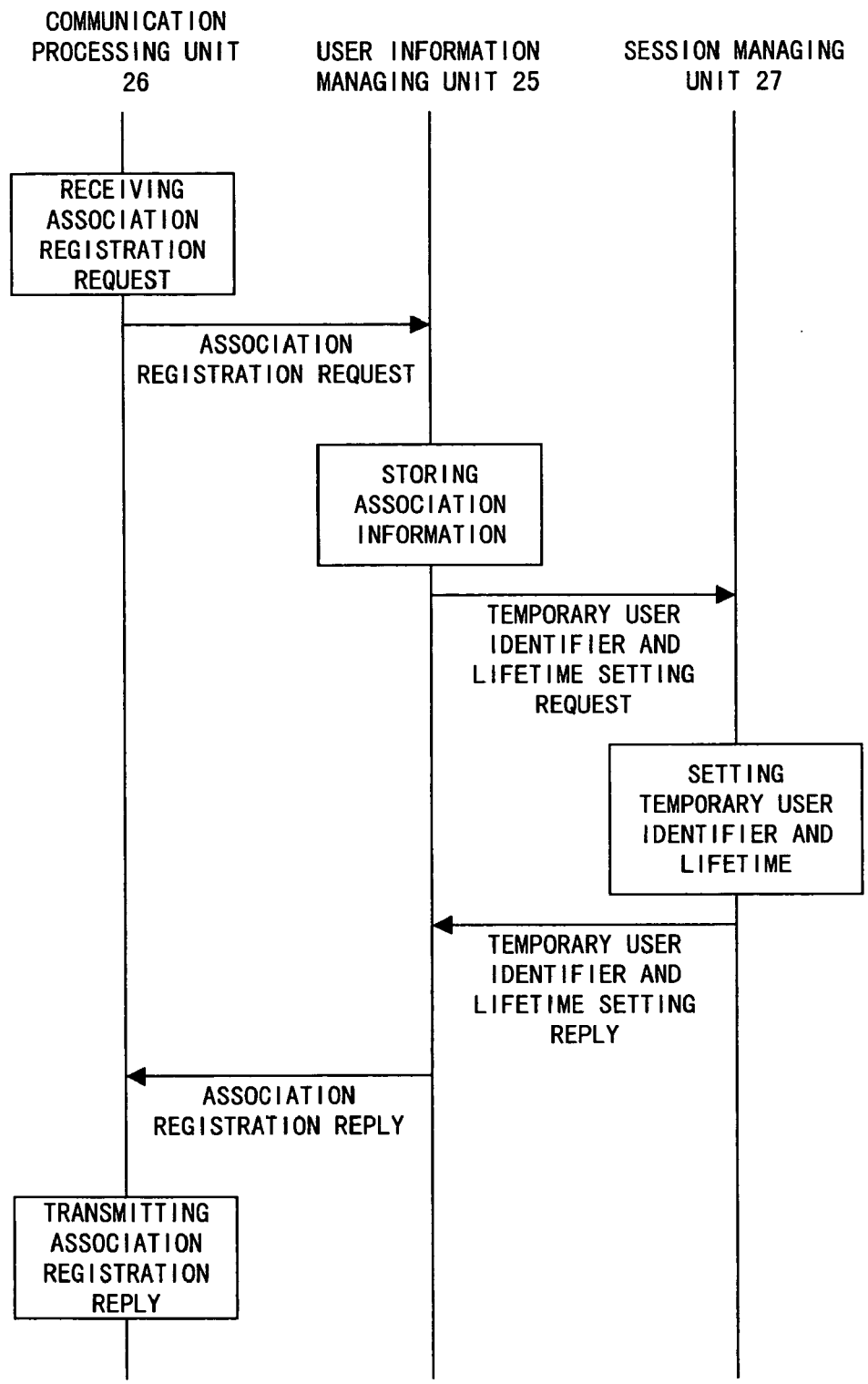
FIG. 12 shows a sequence of the association registration process executed in the temporary user identifier update request receiving side device.

FIG. 12 shows a sequence of the association registration process executed in the temporary user identifier update request receiving side device. In this figure, the association registration request transmitted from the user proxy device 13 is received by the communication processing unit 26, this request is notified to the user information managing unit 25, association information is stored, for example, in a memory, etc. and a request to set a temporary user identifier and its lifetime is made from the user information managing unit 25 to the session managing unit 27. Then, the temporary user identifier and the value of the lifetime which are included, for example, in the association registration request message are stored in the memory, etc. by the session managing unit 27, its setting reply is notified to the user information managing unit 25, an instruction of the association registration reply is made from the user information managing unit 25 to the communication processing unit 26 and the association registration reply is transmitted to the user proxy device 13 side.

A case where a temporary user identifier is updated by a request from the update request transmitting side device 14 in respect of a sequence of a temporary user identifier update process is explained with reference to FIGS. 13 to 15. FIG. 13 shows the entire update sequence. In this sequence, a temporary user identifier update request is transmitted from the temporary user identifier update request transmitting side device 14 to the temporary user identifier update request receiving side device 15 and a new temporary user identifier and its lifetime which are included in the update request message are stored in the memory, etc. by the update request receiving side device 15 so that a temporary user identifier update reply is made from the receiving side device 15 to the update request transmitting side device 14.

Figure 14:
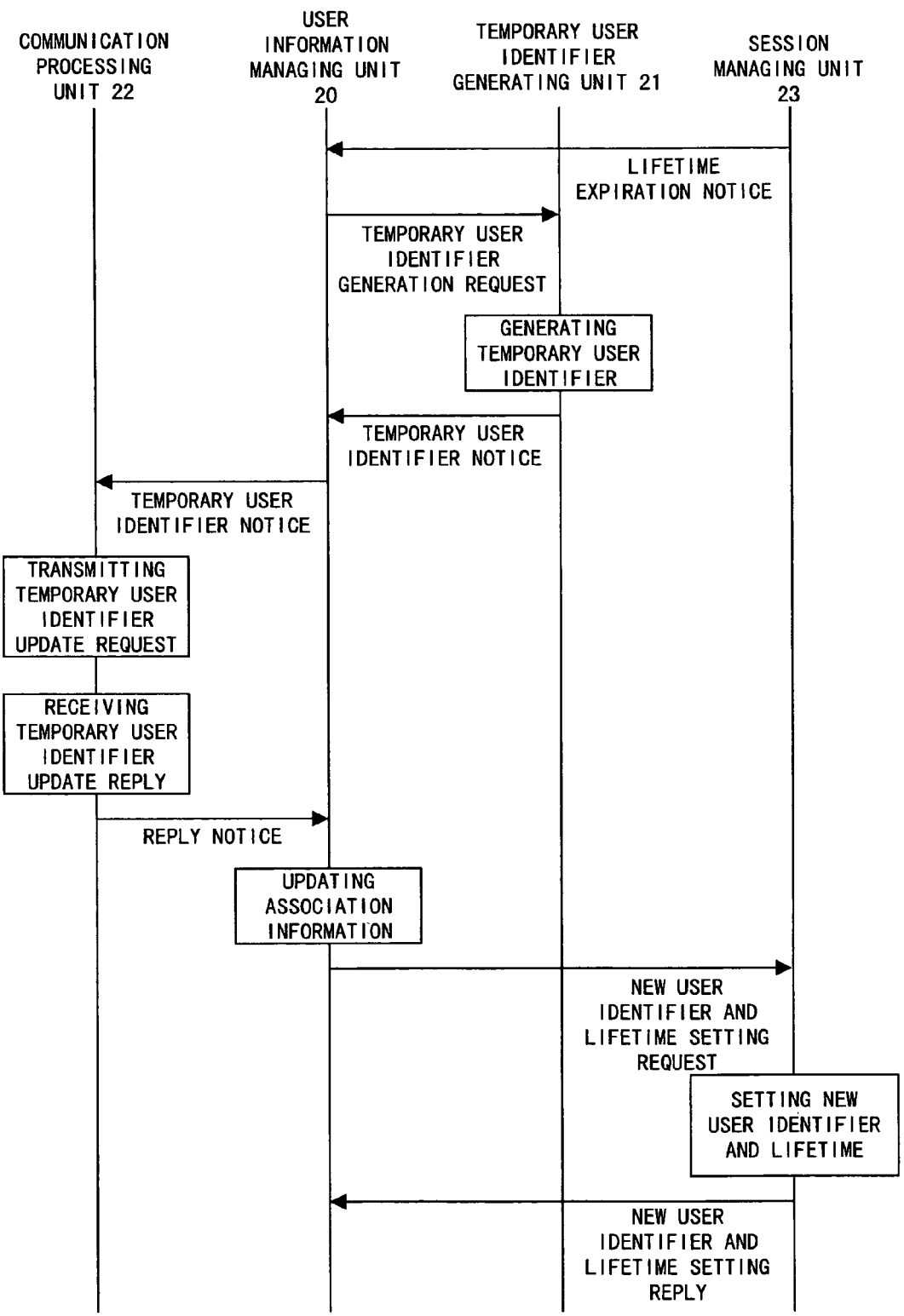
FIG. 14 shows an update process sequence executed in the temporary user identifier update request transmitting side device.

FIG. 14 shows a sequence of the temporary user identifier update process executed in the temporary user identifier update request transmitting side device 14. In this figure, a lifetime expiration notice is made from the session managing unit 23 to the user information managing unit 20 before the lifetime of the currently set temporary user identifier expires. Then, a request to generate a new temporary user identifier is made from the user information managing unit 20 to the temporary user identifier generating unit 21. The generated temporary user identifier is notified to the communication processing unit 22 via the user information managing unit 20. Then, a temporary user identifier update request is transmitted from the communication processing unit 22 to the temporary user identifier update request receiving side device 15. Corresponding to the update request, an update reply transmitted from the update request receiving side device 15 is received by the communication processing unit 22 and the update reply is notified to the user information managing unit 20. Then, association information is updated by the user information managing unit 20 and a lifetime setting request is made to the session managing unit 23. After the new temporary user identifier and its lifetime are stored in the memory, etc., a lifetime setting reply is notified to the user information managing unit 20.

Figure 15:
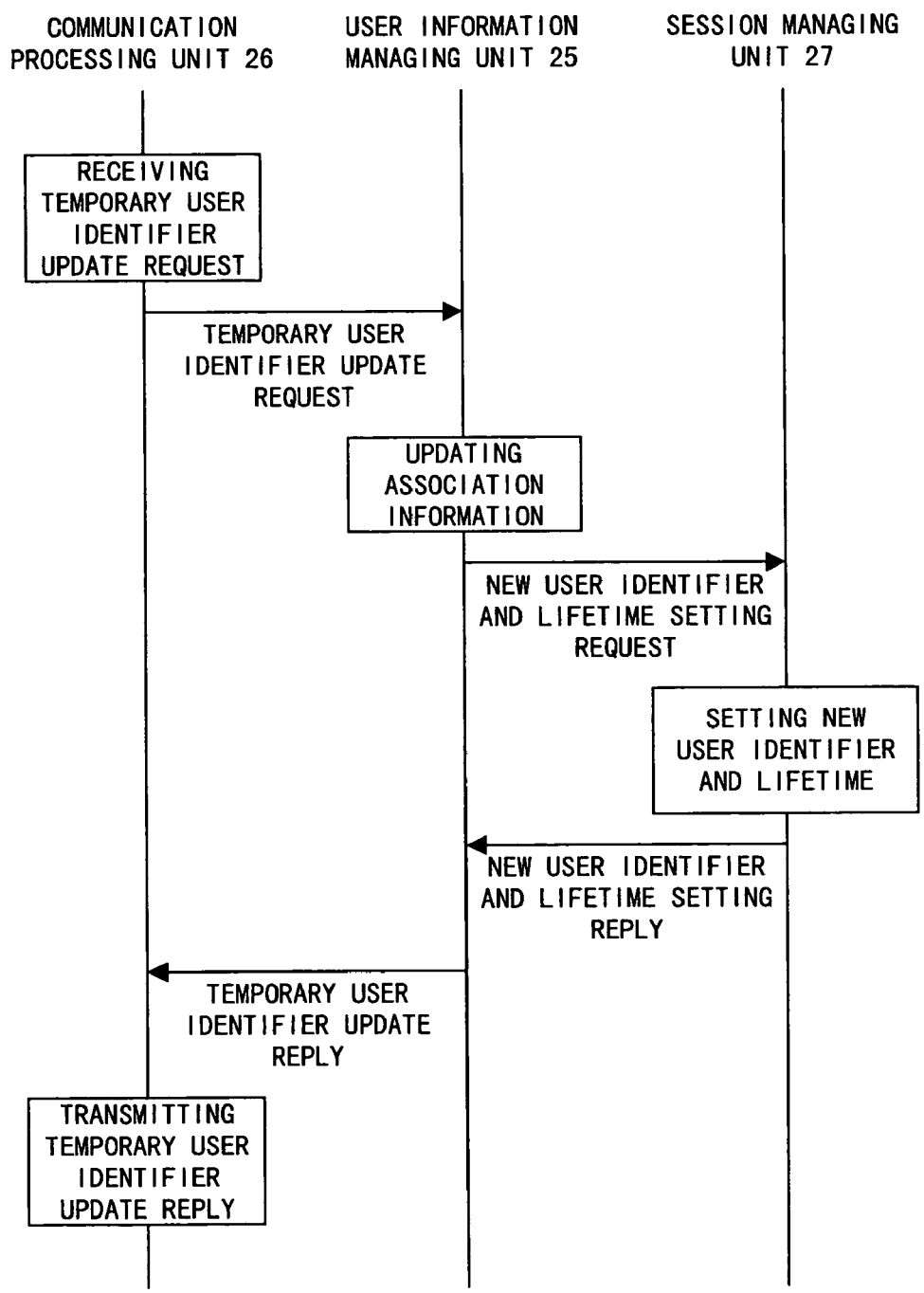
FIG. 15 shows an update process sequence executed in the temporary user identifier update request receiving side device.

FIG. 15 shows a sequence of the temporary user identifier update process executed in the temporary user identifier update request receiving side device 15. In this figure, a temporary user identifier update request transmitted to the update request receiving side device 15 is received by the communication processing unit 26 and this request is notified to the user information managing unit 25. A request to set the lifetime of a new temporary user identifier is transmitted from the user information managing unit 25 to the session managing unit 27 while association information is updated. After the new temporary user identifier and the value of its lifetime are stored in the memory, etc., a lifetime setting reply is notified to the user information managing unit 25, an instruction of a temporary user identifier update reply is made from the user information managing unit 25 to the communication processing unit 26 and the temporary user identifier update reply is transmitted from the communication processing unit 26 to the update request transmitting side device 14.

Figure 16:
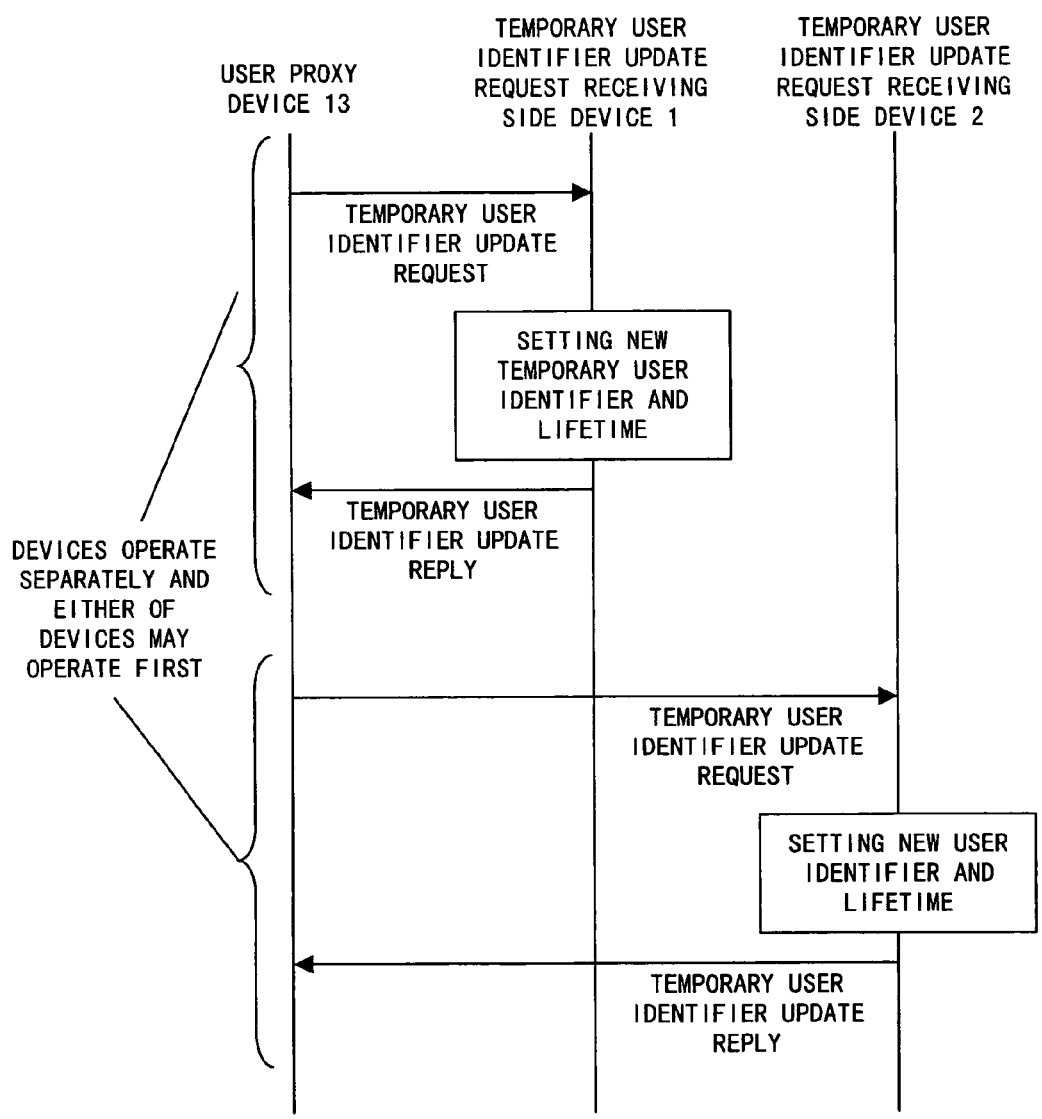
FIG. 16 explains the whole of a temporary user identifier update sequence in accordance with a request from the user proxy device.

FIGS. 16 and 17 explain a sequence executed when a temporary user identifier is updated by a request from the user proxy device 13. In the above provided explanation, an initially used temporary user identifier is transmitted from the user proxy device 13 to the update request transmitting side device 14 and the update request receiving side device 15 when a service starts to be used. After the lifetime of the initial temporary user identifier expires, a data exchange, etc. is made between the transmitting side device 14 and the receiving side device 15 using the new temporary user identifier generated by the update request transmitting side device 14. However, a temporary user identifier update request may be continuously transmitted by the user proxy device 13 to the two devices 14 and 15 and the two devices 14 and 15 may make a data exchange, etc. using the new temporary user identifier included in the update request message. FIGS. 16 and 17 explain the sequence executed in such a case.

Unlike FIG. 3, a temporary user identifier update request is transmitted from the user proxy device 13 to each of two temporary user identifier update request receiving side devices in FIG. 16. Then, in a similar manner as in FIG. 9, a new temporary user identifier and its lifetime are set on each of the sides of the two devices, and update replies are returned to the user proxy device 13.

FIG. 17 shows a sequence of the identifier update process executed in the user proxy device 13. Comparing this figure with the sequence of the association registration process shown in FIG. 10, an expiration notice of the lifetime of the currently set temporary user identifier is first transmitted from the session managing unit 19 to the service information managing unit 16. Then, a new temporary user identifier generation request is made from the service information managing unit 16 to the temporary user identifier generating unit 17. Except for these processes, the subsequent sequence is fundamentally similar to that shown in FIG. 10.

Figure 18:
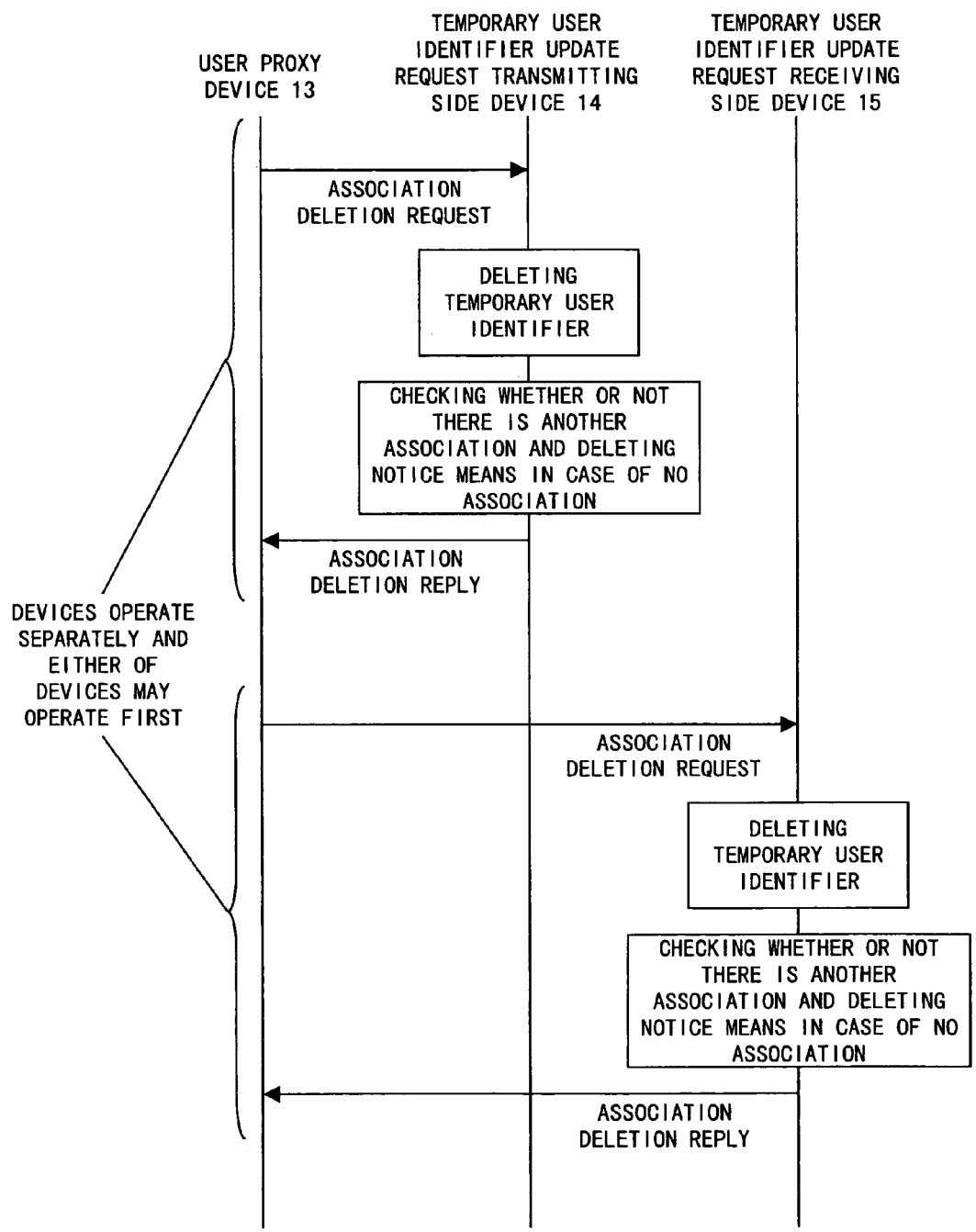
FIG. 18 explains the whole of the association deletion sequence in accordance with a request from the user proxy device.
Figure 19:
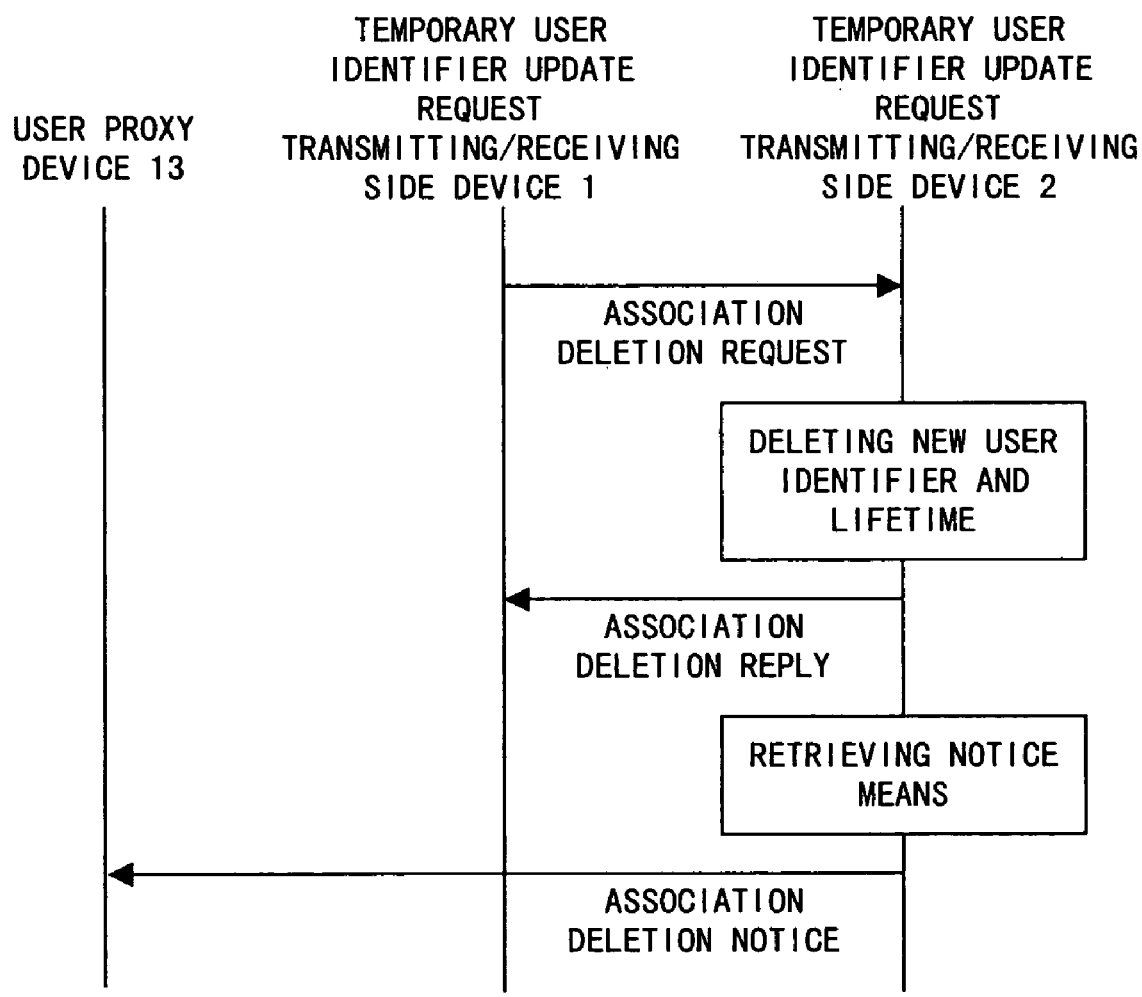
FIG. 19 explains the whole of the association deletion sequence in accordance with a request from the temporary user identifier update request transmitting side device and the temporary user identifier update request receiving side device.

Then, the sequence of the association deletion process is explained with reference to FIGS. 18 and 19. FIG. 18 explains a whole sequence of the association deletion process in the case where this process is performed based on a request from the user proxy device 13. In this figure, the user proxy device 13 transmits the association deletion request to each of the temporary user identifier update request transmitting side device 14 and the temporary user identifier update request receiving side device 15, for example, when the receipt of a service terminates. Each of these two devices deletes a temporary user identifier corresponding to the user and a pair of a user identifier and the temporary user identifier as association information. Furthermore, it is retrieved whether or not the user identifier included in the received request is associated with another temporary user identifier. In the case where there is no association, the information to be notified to the user corresponding to the user identifier is deleted and the association deletion reply is returned. These operations may be simultaneously performed for the two devices. In the case where these operations are sequentially performed, the order may be arbitrary in a similar manner as in the example shown in FIG. 9.

It is also thought that user's personal information leaks while the user proxy device 13 uses the services provided by the temporary user identifier update request transmitting side device 14 and the temporary user identifier update request receiving side device 15. In order to cope with such a problem, it is possible that the temporary user identifier update request transmitting side device 14 or the temporary user identifier update request receiving side device 15 detects the leakage of personal information and the device which detects the leakage makes an association deletion request. FIG. 19 explains a whole sequence in the case where the association deletion request is made by the temporary user identifier update request transmitting side device 14 or the temporary user identifier update request receiving side device 15 in the preferred embodiment of the present invention as described above. In this figure, the association deletion request can be made by either one of the devices which provide a service to a user so that the device which provides a service to a user is defined as a temporary user identifier update request transmitting/receiving side device since it is not necessary to distinguish the two devices. At first, the temporary user identifier update request transmitting/receiving side device 1 transmits the association deletion request to the temporary user identifier update request transmitting/receiving side device 2 and then the temporary user identifier update request transmitting/receiving side device 2 deletes a pair of the temporary user identifier corresponding to the user and the user identifier as the association information, thereby returning the association deletion reply. Then, the temporary user identifier update request transmitting/receiving side device 2 retrieves the notice method of a user to which the association is deleted and it transmits the association deletion notice to the user proxy device 13 using the retrieved information.

Figure 20:
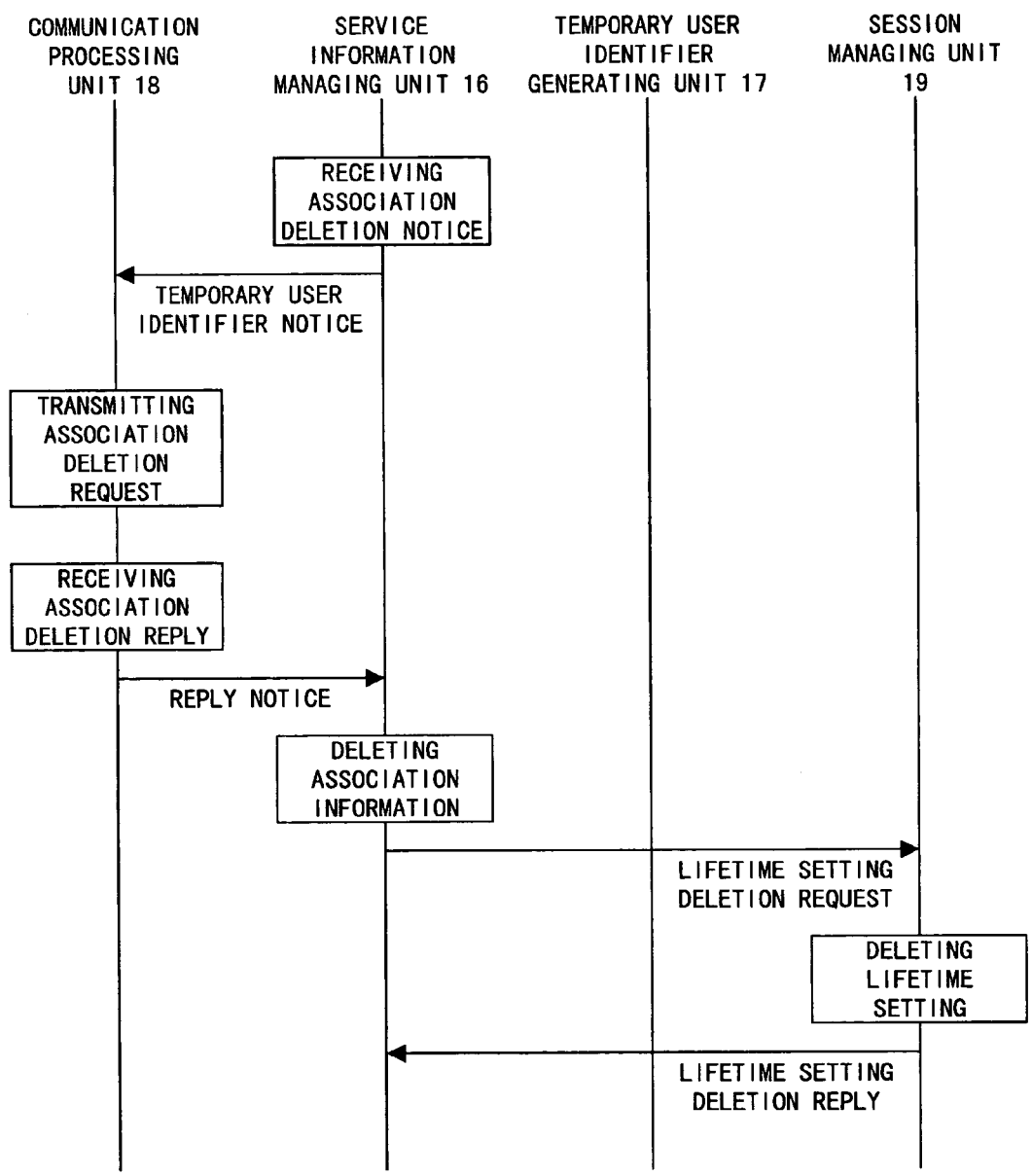
FIG. 20 explains the association deletion sequence in the user proxy device.
Figure 21:
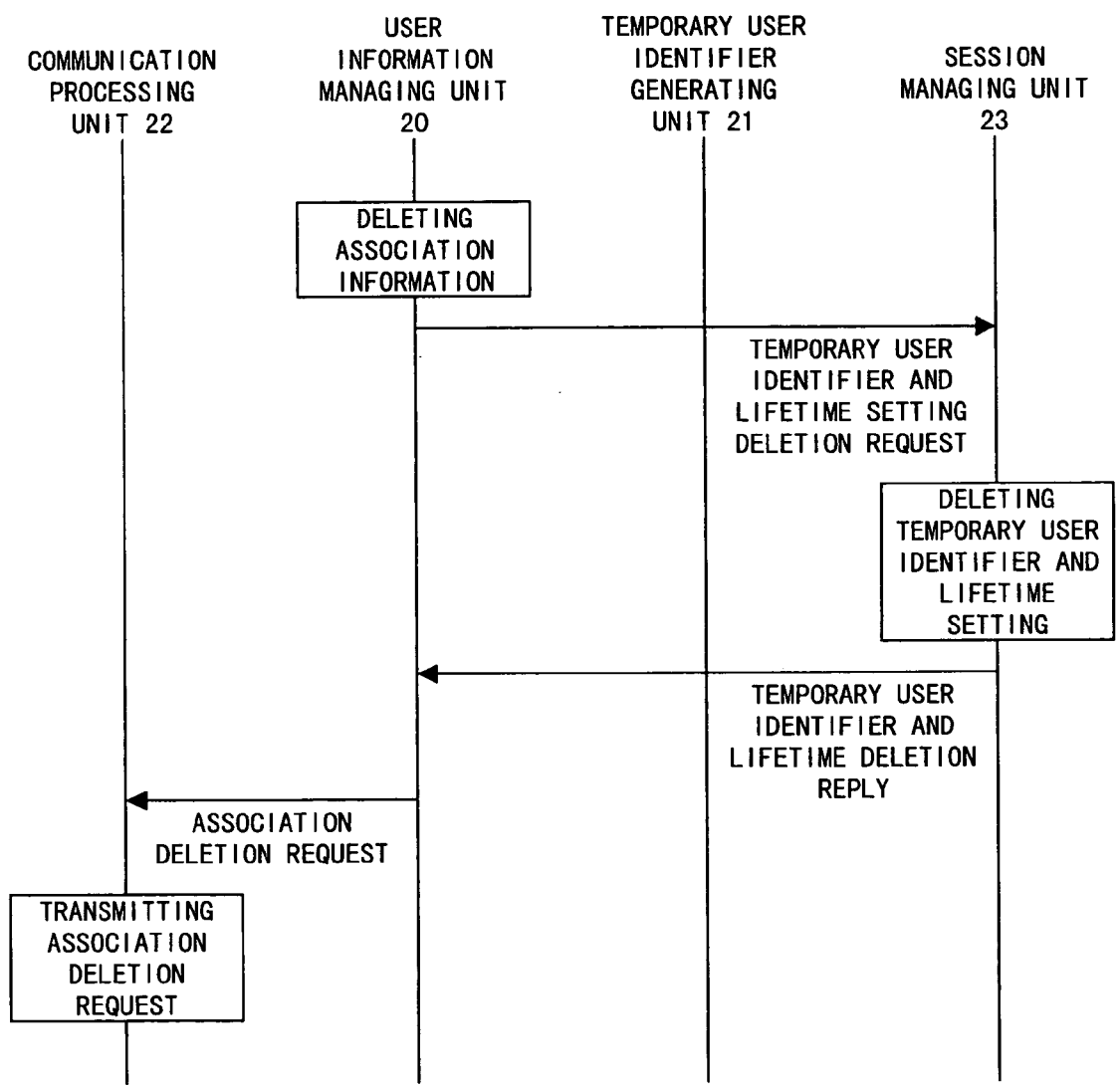
FIG. 21 explains the association deletion sequence in the temporary user identifier update request receiving side device in accordance with a request from the temporary user identifier update request transmitting side device.
Figure 22:
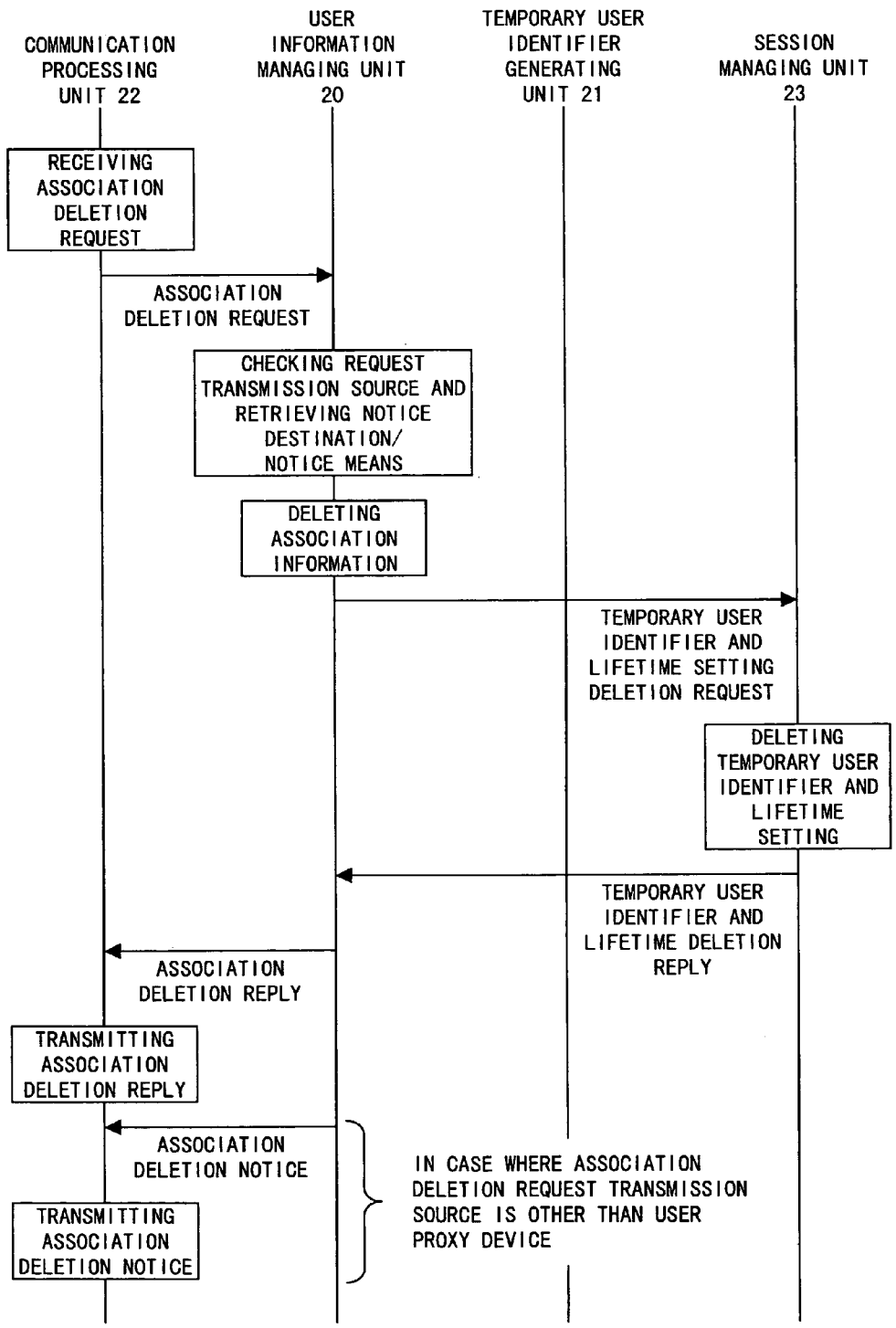
FIG. 22 explains the association deletion sequence in the temporary user identifier update request transmitting side device when the device receives the association deletion request.

The following is the explanation of the sequence of transmitting the association deletion request in each device with reference to FIGS. 20 to 22.

FIG. 20 shows the sequence of the association deletion process performed by the user proxy device 13 in the preferred embodiment of the present invention. In this figure, the association can be deleted by user's intention or the leakage of user information, etc. At first, the service information managing unit 16 notifies a pair of a user identifier and a temporary user identifier to the communication processing unit 18 and then the communication processing unit 18 transmits this pair to the temporary user identifier update request transmitting side device 14 and the temporary user identifier update request receiving side device 15 as the association deletion request. When the communication processing unit 18 receives the association deletion reply, this reply is notified to the service information managing unit 16 and the association information is deleted by the service information managing unit 16. Then, the service information managing unit 16 requests the session managing unit 19 to delete the setting of the lifetime of the temporary user identifier and the session managing unit 19 deletes the setting of the lifetime of the temporary user identifier, thereby returning the reply to the service information managing unit 16. Meanwhile, in the case where the user proxy device 13 receives the association deletion notice after the association is deleted according to the association deletion process sequence as shown in FIG. 19, the association information deletion performed by the service information managing unit 16 and the subsequent processes are performed.

FIG. 21 shows the sequence performed in the temporary user identifier update request transmitting side device 14 in the case where the temporary user identifier update request transmitting side device 14 transmits the association deletion request, in the preferred embodiment of the present invention. In this figure, in the case where the association is deleted by, for example, the leakage of user information, etc., the user information managing unit 20 deletes the pair of a user identifier and a temporary user identifier, it requests the session managing unit 23 to delete the setting of a lifetime of the temporary user identifier and then the session managing unit 23 deletes the setting of a lifetime of the temporary user identifier, thereby returning a reply to the user information managing unit 20. Furthermore, the user information managing unit 20 notifies the pair of a user identifier and a temporary user identifier to the communication processing unit 22. Then, the communication processing unit 22 transmits this pair to the temporary user identifier update request receiving side device 15 as an association deletion request. Meanwhile, in the case where the temporary user identifier update request receiving side device 15 transmits the association deletion request, processes are performed in the same sequence as the above-mentioned so that the explanation is omitted here.

Then, the sequence performed in each unit for receiving an association deletion request is explained with reference to FIGS. 22 and 23.

FIG. 22 shows the sequence performed in the temporary user identifier update request transmitting side device 14 in the case where the temporary user identifier update request transmitting side device 14 receives the association deletion request, in the preferred embodiment of the present invention. In this figure, the communication processing unit 22 receives the association deletion request transmitted from the user proxy device 13 or the temporary user identifier update request receiving side device 15 and then the request is notified to the user information managing unit 20. Here, the user information managing unit 20 checks the request transmission source and it retrieves the notice information to the user for notifying later that the association is deleted for the user proxy device 13 in the case where the transmission resource is not the user proxy device 13, thereby storing the information. Then, the pair of a user identifier and a temporary user identifier is retrieved to be deleted and the user information managing unit 20 further requests the session managing unit 23 to delete the lifetime setting. Then, the session managing unit 23 deletes the lifetime setting and returns the reply to the user information managing unit 20. In the case where the request transmission source is not the user proxy device 13, the notice information to a user, which is stored in the user information managing unit 20 is notified to the communication processing unit 22 and the communication processing unit 22 can transmit the association deletion notice to the user proxy device 13 using this information.

Figure 23:
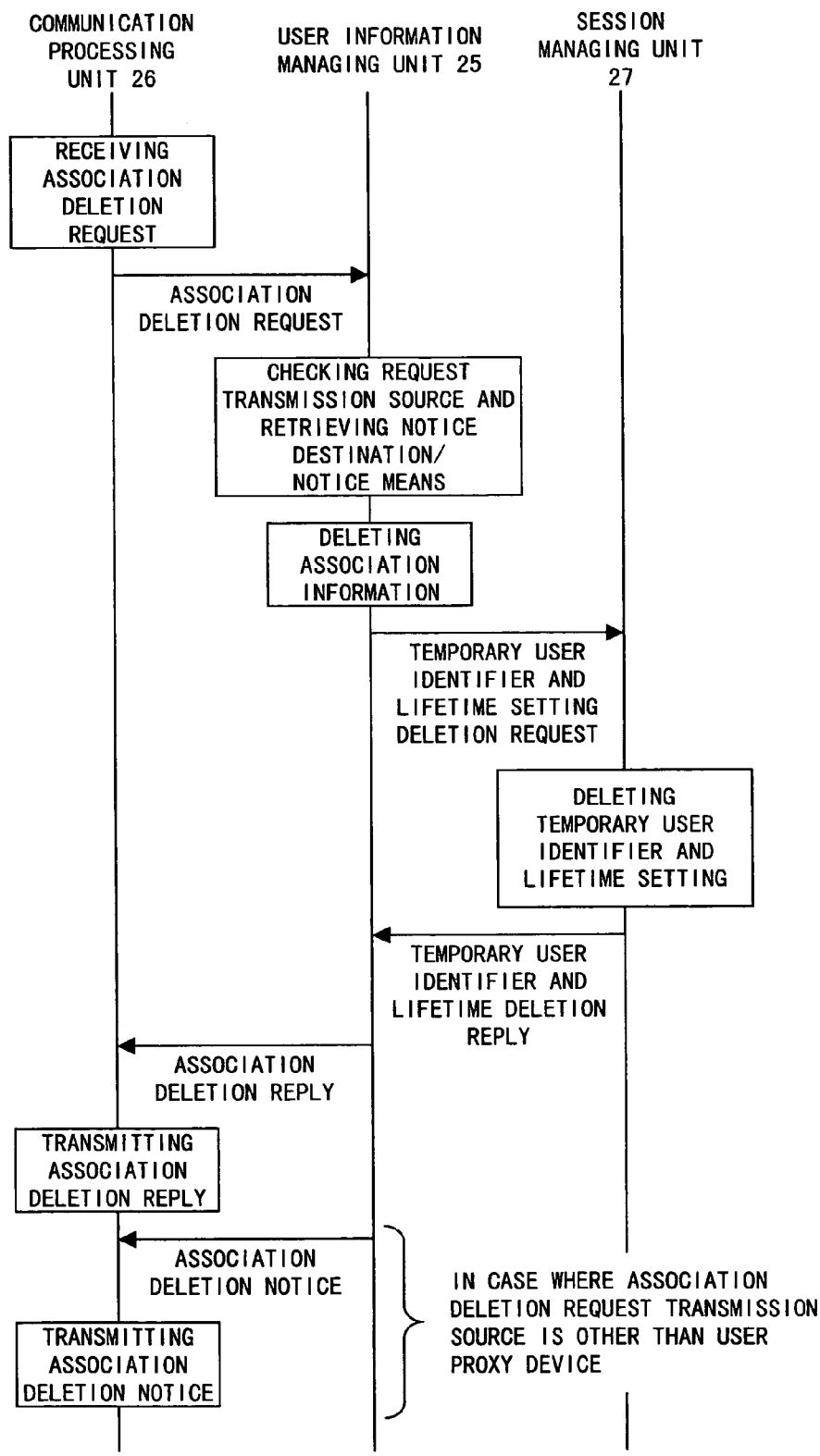
FIG. 23 explains the association deletion sequence in the temporary user identifier update request receiving side device when the device receives the association deletion request.

FIG. 23 shows the sequence performed in the temporary user identifier update request receiving side device 15 in the case where the temporary user identifier update request receiving side device 15 receives the association deletion request, in the preferred embodiment of the present invention. In this figure, the association deletion request transmitted by the user proxy device 13 or the temporary user identifier update request transmitting side device 14 is received by the communication processing unit 26 and this request is notified to the user information managing unit 25. Here, the user information managing unit 25 checks the request transmission source and it retrieves the notice information to a user for notifying later that the association is deleted for the user proxy device 13 in the case where the transmission source is not the user proxy device 13, thereby storing the information. Then, the pair of a user identifier and a temporary user identifier is retrieved to be deleted and the user information managing unit 25 further requests the session managing unit 27 to delete the lifetime setting. The session managing unit 27 deletes the lifetime setting and returns the reply to the user information managing unit 25. In the case where the request transmission source is not the user proxy device 13, the notice information to a user, which is stored in the user information managing unit 25 is notified to the communication processing unit 26 and then the communication processing unit 26 can transmit the association deletion notice to the user proxy device 13 using this information.

The following is the explanation of the information stored in the user proxy device, the temporary user identifier update request transmitting side device and the temporary user identifier update request receiving side device corresponding to the above-mentioned sequence and the messages among the respective devices, for example, the information included in a request message or a reply message in the association registration in FIG. 9. FIG. 24 shows the explanation of information stored in the temporary user identifier update request transmitting side device. This figure shows the information stored in the temporary user identifier update request transmitting side device in the case where a necessary data exchange is performed between the temporary user identifier update request transmitting side device and the temporary user identifier update request receiving side device after a temporary user identifier is generated using a random number value corresponding to the user identifier and an association of the temporary user identifier is performed, unlike the case where a result obtained by performing a hash operation for the concatenation of the user identifier in a service on a partner side and a random number is defined as a temporary user identifier as is explained in FIG. 4.

In FIG. 24, access information and information to be accessed are stored at first. These pieces of information are necessary for a data exchange between a temporary user identifier update request transmitting side device and a temporary user identifier update request receiving side device. Access information is used for accessing from a temporary user identifier update request transmitting side device to a temporary user identifier update request receiving side device. This information includes a user's user identifier, a service on a partner side, that is, an identifier of a service provided by the temporary user identifier update request receiving side device, a temporary identifier of a user for using this service and an address of the access destination.

On the other hand, information to be accessed includes a user's user identifier, an identifier of the service on a partner side, a user's temporary user identifier on the temporary user identifier update request transmitting side device and an address of the temporary user identifier update request receiving side device which is an access source, as the information for identifying the access from a partner side, that is, the temporary user identifier update request receiving side device.

As the information stored in the temporary user identifier update request transmitting side device, lifetimes of two temporary user identifiers are further stored as session information. Namely, lifetimes are respectively stored for a temporary user identifier bbb for identifying a user on the update request receiving side device on a partner side and a temporary user identifier eee for identifying a user in the update request transmitting side device. As the information to be notified to a user, which is used when the association is deleted, a notice means and identification information can be stored for each user identifier. As the notice means, the type of a communication means such as "e-mail", "IM", etc. can be stored and as the identification information, an e-mail address corresponding to the communication means can be stored.

FIG. 25 shows information stored in the temporary user identifier update request receiving side device and this information is information in the case where a random number value is used as a temporary user identifier in a similar manner as in FIG. 24. Similarly to the information stored in the temporary user identifier update request transmitting side, device shown in FIG. 24, access information, namely, information for accessing the update request transmitting side device, information to be accessed, namely, information for identifying an access from the update request transmitting side device and lifetimes of two temporary user identifiers are stored. In addition, the information to be notified to a user can also be stored.

FIG. 26 explains information stored in the user proxy device. In this figure, as access information for accessing the temporary user identifier update request transmitting side device and the receiving side device, a user's user identifier for each of the devices, an identifier of a service in each of the devices, a temporary user identifier corresponding to the user identifier and an address of an access destination are stored. The first line of the access information is access information for the update request receiving side device and the second line is access information for the update request transmitting side device if this figure is corresponded to FIGS. 24 and 25.

The user proxy device further stores information for respectively identifying accesses from the update request receiving side and transmitting side devices as the information to be accessed and session information indicating the lifetimes of two temporary user identifiers. FIGS. 24 to 30 to be described later explain information in a case where a random number value is used as a temporary user identifier.

FIG. 27 explains information included in the association registration request message, for example, information included in the association registration request message shown in FIG. 9. Firstly, information indicating that a message type is the association registration request and an address of a device which provides a service cooperatively with a transmission destination of the message are stored. Additionally, a temporary user identifier corresponding to a user identifier and a lifetime of the temporary user identifier are stored. Furthermore, identification information at the time of receiving the association deletion notice can be included in the message.

FIG. 28 explains information included in the association registration reply message. As this information, the association registration reply as a message type; a process corresponding to the association registration request; namely, the distinction of whether the result of a process for storing a pair of a user identifier and a temporary user identifier, and a lifetime is OK or NG; and the lifetime of the temporary user identifier are stored. Here, the reason why the lifetime of the temporary user identifier is stored is such that the lifetime can be stored in the registration reply message and returned to the user proxy device, for example, if the temporary user identifier update request transmitting side device, etc. desire to set a shorter lifetime according to the circumstances of a service in response to the association registration request transmitted from, for example, the user proxy device.

FIG. 29 explains information included in the temporary user identifier update request message, for example, a message transmitted from the update request transmitting side device to the update request receiving side device in FIG. 13. In this figure, the message includes a temporary user identifier update request as a message type, an address of an access destination of the message, old and new temporary user identifiers and the lifetime of the new temporary user identifier. The address of the access destination, the name of the temporary user identifier, etc. are not strictly uniformed, for example, with those in FIG. 24, etc.

FIG. 30 explains information included in the temporary user identifier update reply message. This message stores a temporary user identifier update reply as a message type, a process result and the lifetime of a temporary user identifier in a similar manner to those shown in FIG. 28.

Subsequently, information stored in the respective devices when a temporary user identifier is generated using an irreversible operation such as a hash operation, etc. as described with reference to FIG. 4 and information included in the messages is described next with reference to FIGS. 31 to 35.

FIG. 31 explains information stored in the temporary user identifier update request transmitting side device. In this figure, access information and information to be accessed are stored. Compared with FIG. 24, a temporary user identifier is not included in the access information. Here, a hash operation is assumed to be performed, by way of example, for a result of concatenating a user identifier, a service identifier and a random number, slightly unlike the explanation of FIG. 4. However, there is no need to possess a temporary user identifier as access information by storing a random number if a temporary user identifier is obtained with its calculation and an access is made using the obtained temporary user identifier each time the access must be made to the update request receiving side device. If the temporary user identifier is continuously stored as access information, the temporary user identifier cannot be always prevented from externally leaking. Therefore, it is also one way to make a calculation for each access without storing a temporary user identifier in the access information. Since the temporary user identifier is not updated here, it is natural that the lifetime of the temporary user identifier is not stored unlike FIG. 24. In the same manner as an example in FIG. 24, the notice information to a user can be stored.

FIG. 32 explains information stored in the temporary user identifier update request receiving side device. In the same manner as the update request transmitting side device shown in FIG. 31, access information, information to be accessed and notice information to a user are stored. In FIGS. 31 and 32, contents of a user identifier, an address, etc. are not corresponded between the respective devices unlike FIGS. 24 and 25.

FIG. 33 explains information stored in the user proxy device. Compared with FIG. 26, although it is natural that a lifetime of the temporary user identifier is not included, the value of a temporary user identifier is not included in access information and information to be accessed. The reason is as follows: since the temporary user identifier is not updated after the association registration is made, the value of the temporary user identifier is evident in both the update request transmitting side device and the receiving side device and it can be calculated on demand if a user identifier and a service identifier are specified.

FIG. 34 explains information included in the association registration request message. Compared with FIG. 27, the same information items are stored except for the lifetime of a temporary user identifier because this temporary user identifier is not updated.

FIG. 35 explains information included in the association registration reply message. Since a temporary user identifier is not updated, there is only a difference in a point that the lifetime of the temporary user identifier is not updated in comparison with FIG. 28. In FIGS. 31 to 35, since the temporary user identifier is not updated, the temporary user identifier update request and update reply messages corresponding to FIGS. 29 and 30 are not used.

Information stored in the respective devices in the case where a temporary user identifier is generated using an irreversible operation such as a hash operation, etc. and the temporary user identifier is updated corresponding to its lifetime is explained next with reference to FIGS. 36 to 38.

FIG. 36 explains information stored in the temporary user identifier update request transmitting side device. As access information, a random number for generating a temporary user identifier is included in addition to a user identifier, a service identifier and an address of an access destination. As explained with reference to FIG. 5, for example, on the service 1 side, a hash operation is performed using the user identifier of the local device side and a random number transmitted from a user, and a result of the hash operation is transmitted to the service 2 side. The random number for the hash operation is stored as access information.

Information to be accessed and notice information to user are similar, for example, to that shown in FIG. 31 and it includes a temporary user identifier for identifying an access from the update request receiving side device and notice information for transmitting the association delete notice. As session information, lifetimes are respectively included in the random number and the temporary user identifier.

FIG. 37 explains information stored in the temporary user identifier update request receiving side device. Its contents are information having exactly the same format as that shown in FIG. 36, namely, the information stored in the update request transmitting side device.

FIG. 38 explains information stored in the user proxy device. Compared, for example, with FIG. 26, there is a difference in a point that random numbers for generating temporary user identifiers, namely, the values of random numbers respectively used corresponding to the update request transmitting side device and the receiving side device are stored instead of temporary user identifiers, and the random numbers and the values of the lifetimes of the random numbers are stored as session information. A case where the values of random numbers used in FIG. 5 are different between the sides of the services 1 and 2, namely, between the update request transmitting side device and the receiving side device is shown here.

Information included in the respective messages such as the association registration request message, the registration reply message, the temporary user identifier update request message and the update reply message when a temporary user identifier is updated using an irreversible operation such as a hash operation, etc. for a temporary user identifier have the same formats as those of the information explained with reference to FIGS. 27 to 30 in the case where a random number value is used for a temporary user identifier. Therefore, its explanation is omitted.

Lastly, information included in the association deletion request message and the association deletion reply message, which are used in the association deletion sequences shown in FIGS. 18 to 23, are explained with reference to FIGS. 39 and 40.

FIG. 39 shows information included in the association deletion request message. The association deletion request as a message type, an address of an access destination, a temporary user identifier to be deleted since the association becomes unnecessary and a user identifier paring with the temporary user identifier are stored. This association deletion request message is the information transmitted from the user proxy device 13 to the temporary user identifier update request transmitting side device 14 and the temporary user identifier update request receiving side device 15 in FIG. 18. In FIG. 19, this message is the information transmitted from the temporary user identifier update request transmitting/receiving side device 1 to the temporary user identifier update request transmitting/receiving side device 2.

The association deletion reply message shown in FIG. 40 includes the association deletion reply as a message type and the information indicating OK or NG as a process result. This association deletion request message is the information transmitted from the temporary user identifier update request transmitting side device 14 and the temporary user identifier update request receiving side device 15 to the user proxy device 13 in FIG. 18. In FIG. 19, this message is the information transmitted from the temporary user identifier update request transmitting/receiving side device 2 to the temporary user identifier update request transmitting/receiving side device 1.

What is claimed is:

1. A network service system using a temporary user identifier, where information of a user using a plurality of services is shared by the plurality of services, comprising:

a temporary user identifier update request transmitting side device which provides a first service to the user and can transmit an update request of a temporary user identifier shared within the network service system as information of the user;

a temporary user identifier update request receiving side device which is connected to said temporary user identifier update request transmitting side device by a network and can receive the update request of a temporary user identifier that is transmitted from said temporary user identifier update request transmitting side device, for providing a second service cooperating with the first service to the user using updated temporary user identifier corresponding to the update request; and a user proxy device which is connected to said temporary user identifier update request transmitting side device and said temporary user identifier update request receiving side device by the network, and with which the user receives the first and the second services, wherein:

said user proxy device generates temporary user identifiers using a random number corresponding to user identifiers of a user for services provided in said temporary user identifier update request transmitting side device and said temporary user identifier update request receiving side device, and it transmits to said temporary user identifier update request transmitting side device and said temporary user identifier update request receiving side device, an association registration request message including the generated temporary user identifier and notice information to the user;

said notice information to the user includes a type of a communication means to communicate with said user proxy device and address information corresponding to the type;

each of said temporary user identifier update request transmitting side device and said temporary user identifier update request receiving side device transmits an association reply message to a side of the user proxy device after setting the temporary user identifier, a valid time period of the temporary user identifier and the notice information to the user; and said address information is used to notify, by said communication means whose type is described in said notice information to the user, said user proxy device that an association is deleted when the association is deleted before the valid time period of the generated temporary user identifier expires.

2. The network service system using a temporary user identifier according to claim 1, wherein:

said user proxy device transmits an association deletion request message including a pair of the user identifier and the temporary user identifier to each of said temporary user identifier update request transmitting side device and said temporary user identifier update request receiving side device before a valid time period of the temporary user identifier expires;

each of said temporary user identifier update request transmitting side device and said temporary user identifier update request receiving side device transmits an association deletion reply message to said user proxy device after deleting a pair of the user identifier and the temporary user identifier; and said user proxy device deletes a pair of the user identifier and the temporary user identifier after receiving the association deletion reply messages from said two devices.

3. The network service system using a temporary user identifier according to claim 1, wherein:

said temporary user identifier update request transmitting side device or said temporary user identifier update request receiving side device transmits an association deletion request message including the temporary user identifier to said temporary user identifier update request receiving side device or said temporary user identifier update request transmitting side device before a valid time period of the temporary user identifier expires; and said temporary user identifier update request receiving side device or said temporary user identifier update request transmitting side device which receives the association deletion request message transmits an association deletion reply message to said temporary user identifier update request transmitting side device or said temporary user identifier update request receiving side device after deleting the temporary user identifier.

4. The network service system using a temporary user identifier according to claim 3, wherein said temporary user identifier update request transmitting side device or said temporary user identifier update request receiving side device which transmits the association deletion reply message retrieves notice information to the user and transmits an association deletion notice message to said user proxy device using the retrieval results.

5. A network service system using a temporary user identifier, where information of a user using a plurality of services is shared by the plurality of services, comprising:

a temporary user identifier update request transmitting side device which provides a first service to a user and can transmit an update request of a temporary user identifier shared within the network service system as information of the user;

a temporary user identifier update request receiving side device which is connected to said temporary user identifier update request transmitting side device by a network and can receive the update request of a temporary user identifier that is transmitted from said temporary user identifier update request transmitting side device, for providing a second service cooperating with the first service to the user using an updated temporary user identifier corresponding to the update request; and a user proxy device which is connected to said temporary user identifier update request transmitting side device and said temporary user identifier update request receiving side device by the network, and with which the user receives the first and the second services, wherein:

said user proxy device generates a temporary user identifier using an irreversible operation corresponding to a user identifier of the user for a service provided in each of said temporary user identifier update request transmitting side device and said temporary user identifier update request receiving side device, and it transmits to said temporary user identifier update request transmitting side device and said temporary user identifier update request receiving side device an association registration request message including the generated temporary user identifier and notice information to the user;

said notice information to the user includes a type of a communication means to communicate with said user proxy device and address information corresponding to the type;

each of said temporary user identifier update request transmitting side device and said temporary user identifier update request receiving side device transmits an association reply message to a side of the user proxy device after setting the temporary user identifier, a valid time period of the temporary user identifier and the notice information to the user; and said address information is used to notify, by said communication means whose type is described in said notice information to the user, said user proxy device that an association is deleted when the association is deleted before the valid time period of the generated temporary user identifier expires.

6. A network service system using a temporary user identifier, where information of a user using a plurality of services is shared by the plurality of services, comprising:

a user proxy device with which a user receives a plurality of services to be cooperatively executed, for generating temporary user identifiers corresponding to user identifiers in the plurality of services and for transmitting the temporary user identifiers to respective devices which provide the plurality of services; and a plurality of temporary user identifier update request receiving side devices which are connected to the user proxy device by a network and provide respective services to be cooperatively executed to user, for providing a service to a user using a temporary user identifier transmitted from said user proxy device, wherein:

said user proxy device transmits an association registration request message further including notice information to the user;

each of temporary user identifier update request receiving side devices sets the notice information to the user;

said notice information to the user includes a type of a communication means to communicate with said user proxy device and address information corresponding to the type; and said address information is used to notify, by said communication means whose type is described in said notice information to the user, said user proxy device that an association is deleted when the association is deleted before a valid time period of the generated temporary user identifier expires.

7. A user proxy device with which a user receives a plurality of services to be cooperatively executed by a network, comprising:

a service information managing unit for storing a user identifier in a service to be received by a user;

a temporary user identifier generating unit for generating a temporary user identifier corresponding to the user identifier; and a communication processing unit for transmitting a message including a pair of the user identifier and the temporary user identifier to each of respective devices providing a plurality of services, wherein said device transmits a message further including notice information to the user to each of the devices for providing a plurality of services;

said notice information to the user includes a type of a communication means to communicate with said user proxy device and address information corresponding to the type; and said address information is used by said devices providing the services to notify, by said communication means whose type is described in said notice information to the user, said user proxy device that an association is deleted when the association is deleted before a valid time period of the generated temporary user identifier expires.

8. A temporary user identifier update request transmitting side device for providing to a user a different service to be executed cooperatively with a service which is provided to the user by another device in a network service system, comprising:

a communication processing unit for receiving a message which is transmitted from a side of the user and includes a pair of a user identifier corresponding to the different service and a temporary user identifier which corresponds to the user identifier and is shared with another device, and a temporary user identifier updated request transmitted from said other device; and a session managing unit for managing a valid time period of the temporary user identifier; and said temporary user identifier unit for generating a new temporary user identifier, before a valid time period of the temporary user identifier expires, wherein:

said communication processing unit transmits a temporary user identifier update request including a new temporary user identifier to said other device;

said temporary user identifier update request transmitting side device further comprises a user notice unit for managing notice information to the user;

said notice information to the user includes a type of a communication means to communicate with the side of the user and address information corresponding to the type; and said address information is used to notify, by said communication means whose type is described in said notice information to the user, the side of the user that an association is deleted when the association is deleted before the valid time period of the generated temporary user identifier expires.

9. A temporary user identifier update request receiving side device for providing to a user a different service to be executed cooperatively with a service which is provided to the user by another device in a network service system, comprising:

a communication processing unit for receiving a message which is transmitted from a side of the user and includes a pair of a user identifier corresponding to the different service and a temporary user identifier which corresponds to the user identifier and is shared with another device, and a temporary user identifier update request transmitted from said other device; and a session managing unit for managing a valid time period of the temporary user identifier, wherein said temporary user identifier update request receiving side device further comprises a user notice unit for managing notice information to the user;

said notice information to the user includes a type of a communication means to communicate with the side of the user and address information corresponding to the type; and said address information is used to notify, by said communication means whose type is described in said notice information to the user, the side of the user that an association is deleted when the association is deleted before the valid time period of the generated temporary user identifier expires.

10. A network service system using a temporary user identifier, where information of a user using a plurality of services is shared by the plurality of services, comprising:

a temporary user identifier update request transmitting side device for providing a first service to the user; and a temporary user identifier update request receiving side device which is connected to said temporary user identifier update request transmitting side device by a network, for providing a second service cooperating with the first service to the user;

a user proxy device which is connected to said temporary user identifier update request transmitting side device and said temporary user identifier update request receiving side device by the network, and with which the user receives the first and the second services, wherein:

said user proxy device transmits to each of said temporary user identifier update request transmitting side device and said temporary user identifier update request receiving side device, an association deletion request message including a user identifier and a temporary user identifier;

each of said temporary user identifier update request transmitting side device and said temporary user identifier update request receiving side device deletes a pair of the user identifier and the temporary user identifier, and each device transmits an association deletion reply message to said user proxy device after further deleting notice information to the user in a case where said user proxy device has no other association;

said notice information to the user includes a type of a communication means to communicate with said user proxy device and address information corresponding to the type;

said address information is used to notify, by said communication means whose type is described in said notice information to the user, said user proxy device that an association is deleted when the association is deleted before a valid time period of the generated temporary user identifier expires; and said user proxy device deletes a pair of the user identifier and the temporary user identifier after receiving the association deletion reply message from the two devices.

* * * * *